United States Patent
Armstrong et al.

(10) Patent No.: US 7,253,717 B2
(45) Date of Patent: Aug. 7, 2007

(54) METHOD AND SYSTEM FOR COMMUNICATING WITH AND TRACKING RFID TRANSPONDERS

(75) Inventors: John T. Armstrong, Pasadena, CA (US); John D. Richert, La Habra Heights, CA (US); John P. Palmer, Pomona, CA (US)

(73) Assignee: Mobile Technics LLC, Las Vegas, NV (US)

( * ) Notice: Subject to any disclaimer, the term of this patent is extended or adjusted under 35 U.S.C. 154(b) by 1181 days.

(21) Appl. No.: 09/726,136

(22) Filed: Nov. 29, 2000

(65) Prior Publication Data

US 2002/0175805 A9     Nov. 28, 2002

(51) Int. Cl.
*H04Q 5/22*    (2006.01)
(52) U.S. Cl. ............................ 340/10.2; 340/10.31
(58) Field of Classification Search ............ 340/10.2, 340/572.1; 370/314; 708/250, 251, 254, 708/255
See application file for complete search history.

(56) References Cited

U.S. PATENT DOCUMENTS

| | | | |
|---|---|---|---|
| 3,689,885 A * | 9/1972 | Kaplan et al. ............. | 340/10.1 |
| 3,750,167 A * | 7/1973 | Gehman et al. ............ | 342/44 |
| 4,355,366 A * | 10/1982 | Porter ....................... | 708/255 |
| 4,479,194 A * | 10/1984 | Fogg et al. ................ | 235/386 |
| 4,799,259 A | 1/1989 | Ogrodski | |
| 4,800,590 A | 1/1989 | Vaughn | |
| 4,956,864 A | 9/1990 | Brockman | |
| 5,030,807 A | 7/1991 | Landt et al. | |
| 5,053,774 A | 10/1991 | Schuermann et al. | |
| 5,119,099 A | 6/1992 | Haruyama et al. | |

(Continued)

FOREIGN PATENT DOCUMENTS

DE     196 52 324 A     6/1998

(Continued)

*Primary Examiner*—Edwin C. Holloway, III
(74) *Attorney, Agent, or Firm*—Christensen O'Connor Johnson Kindness PLLC

(57) ABSTRACT

An RFID system and method for communicating between a host computer, one or more interrogators connected to the host computer, and a large body of transponders distributed within an area covered by the interrogators. Each transponder originally has a common identification code, and upon initialization by the host computer internally generates a unique identification code based upon an internally generated random number. The host, through the interrogators, reads each of the identification codes associated with each transponder by iteratively transmitting a read identification code command along with a controlled variable. Each transponder compares the received controlled variable to an internally generated random number, and selectively transmits its identification code based upon the outcome of this comparison. After the completion of each read identification code iteration, the host adjusts the controlled variable based upon the responses received in the previous iteration. Preferably, communications between the interrogators and the transponders are DSSS signals in TDMA format, and the transponders use the random number generator to assign a time slot for transmission of their response. Each interrogator includes an antenna system utilizing a switch matrix to connect multiple antennas having different polarizations, which ensures that all transponders within the range of the interrogator receive the signals from the interrogator. In a further aspect, the interrogators are arranged in groups, each group in nearest neighbor format, to reduce the time for reading the transponders and the emissions generated when more than one interrogator is active at the same time.

35 Claims, 18 Drawing Sheets

U.S. PATENT DOCUMENTS

| | | | |
|---|---|---|---|
| 5,231,273 A * | 7/1993 | Caswell et al. | 235/385 |
| 5,239,167 A | 8/1993 | Kipp | |
| 5,247,699 A | 9/1993 | Hartmann | |
| 5,258,766 A * | 11/1993 | Murdoch | 343/742 |
| 5,307,349 A * | 4/1994 | Shloss et al. | 370/442 |
| 5,455,575 A | 10/1995 | Schuermann | |
| 5,485,463 A * | 1/1996 | Godoroja | 370/333 |
| 5,519,381 A | 5/1996 | Marsh et al. | |
| 5,521,602 A | 5/1996 | Carroll et al. | |
| 5,530,702 A | 6/1996 | Palmer et al. | |
| 5,539,394 A * | 7/1996 | Cato et al. | 340/10.32 |
| 5,539,775 A | 7/1996 | Tuttle et al. | |
| 5,550,547 A | 8/1996 | Chan et al. | |
| 5,559,828 A | 9/1996 | Armstrong et al. | |
| 5,604,486 A | 2/1997 | Lauro et al. | |
| 5,606,323 A * | 2/1997 | Heinrich et al. | 340/10.34 |
| 5,640,683 A | 6/1997 | Evans et al. | |
| 5,649,295 A | 7/1997 | Shober et al. | |
| 5,649,296 A | 7/1997 | MacLellan et al. | |
| 5,686,902 A * | 11/1997 | Reis et al. | 340/10.2 |
| 5,699,066 A * | 12/1997 | Marsh et al. | 342/44 |
| 5,706,218 A | 1/1998 | Hoffman | |
| 5,726,630 A | 3/1998 | Marsh et al. | |
| 5,745,037 A * | 4/1998 | Guthrie et al. | 340/573.4 |
| 5,784,686 A | 7/1998 | Wu et al. | |
| 5,809,142 A | 9/1998 | Hurta et al. | |
| 5,825,806 A | 10/1998 | Tuttle et al. | |
| 5,828,693 A | 10/1998 | Mays et al. | |
| 5,841,770 A * | 11/1998 | Snodgrass et al. | 370/346 |
| 5,940,006 A | 8/1999 | MacLellan et al. | |
| 5,952,922 A | 9/1999 | Shober | |
| 5,963,104 A | 10/1999 | Buer | |
| 5,974,078 A | 10/1999 | Tuttle et al. | |
| 5,986,570 A | 11/1999 | Black et al. | |
| 5,995,017 A | 11/1999 | Marsh et al. | |
| 5,995,048 A | 11/1999 | Smithgall et al. | |
| 6,034,603 A | 3/2000 | Steeves | |
| 6,046,683 A | 4/2000 | Pidwerbetsky et al. | |
| 6,072,421 A * | 6/2000 | Fukae et al. | 342/42 |
| 6,130,602 A | 10/2000 | Deveraux et al. | |
| 6,313,737 B1 * | 11/2001 | Freeze et al. | 340/10.1 |
| 6,321,982 B1 | 11/2001 | Gaultier | |
| 6,456,668 B1 * | 9/2002 | MacLellan et al. | 375/283 |
| 6,646,543 B1 * | 11/2003 | Mardinian et al. | 340/10.2 |

FOREIGN PATENT DOCUMENTS

| | | | |
|---|---|---|---|
| EP | 0 751 646 A | | 1/1997 |
| EP | 0 777 194 A | | 6/1997 |
| EP | 0 944 016 A1 | | 9/1999 |
| EP | 0 946 074 A | | 9/1999 |
| EP | 0 951 154 A | | 10/1999 |
| GB | 2 073 550 A | | 10/1981 |
| GB | 2 305 074 A | | 3/1997 |
| JP | 09 044614 A | | 2/1997 |
| WO | WO 94 05131 A | | 3/1994 |
| WO | WO 96 13955 A | | 5/1996 |
| WO | WO 96 34501 A | | 10/1996 |
| WO | WO 98/39725 | * | 9/1998 |
| WO | WO 00 11592 A | | 3/2000 |
| WO | WO 01 33769 A | | 5/2001 |
| WO | WO 01 41043 A | | 6/2001 |

* cited by examiner

METHOD AND SYSTEM FOR COMMUNICATING WITH AND TRACKING RFID TRANSPONDERS

FIELD OF THE INVENTION

The invention relates generally to a system and method for communicating between a host computer and a plurality of RFID transponders (sometimes called tags) through one or more interrogator units, and more specifically to a system and method which greatly reduces the interference caused by transmissions from RFID transponders to those interrogator units, which increases the spatial area available between an interrogator and an RFID transponder and which allows communication between an interrogator and a large body of RFID transponders, among various other advantages. In addition, the invention also relates to a system and method for tracking a large body of RFID transponders in the case where more than one interrogator unit is employed.

BACKGROUND OF THE INVENTION

As fully described in U.S. Pat. No. 5,530,702 to Palmer et al., a significant difficulty in establishing a multipoint communications system using transponders is how to prevent the transponders from attempting to communicate with the host at the same time. Such common transmissions usually cause a "collision" among the various transmissions and thereby corrupts the transmitted messages and renders them unintelligible to the host system. In the '702 Patent, upon receipt of a "begin" signal transmitted by the host computer (through an interrogator), each transponder generates a random number and initiates an internal counter. When the count of the internal counter matches the random number, the transponder transmits a "request to transmit" signal to the host computer. Upon receipt of such "request to transmit" signal, the host computer transmits a first acknowledgment signal to all of the transponders. If the transponder which has transmitted the "request to transmit" signal receives this first acknowledgment signal within a predetermined period of time, it concludes that it has been given permission to transmit, and transmits an information-based signal to the host computer. If the transponder does not receive the first acknowledgment signal within the predetermined period of time, it generates a new random number and initiates the counter again. In this manner, a large body of transponders may communicate with a host computer. A problem with this approach, as with any approach utilizing random response delays, is that there must be a good estimate of the total transponder population. If there are fewer transponders than expected in the field, this approach will spend an unduly long time waiting for responses, while if the population is too great, this method will be contending with large numbers of collisions for long periods of time.

Other systems for establishing communications between a host computer and a plurality of transponders are disclosed in U.S. Pat. Nos. 5,519,381, 5,550,547, 5,986,570 and 6,034,603. However, as discussed briefly below, each of these systems possesses certain drawbacks in operation that prevent optimum performance. The '381 Patent discloses an identification system having an interrogator and a plurality of transponders, but requires that the interrogator sequentially transmit two different signals to the transponders using two different antennas, to ensure that all transponders are identified, necessitating additional expense and complexity in the design and construction of the interrogator. The '547 Patent discloses a "tree-splitting" algorithm for determining which transponder should transmit wherein the interrogator first transmits a read command and then transmits a failure notice upon the detection of a collision. Approximately half of the transponders will not transmit thereafter, based upon certain internal operations keyed to an internally-generated random number. This operation continues until no failures (collisions) are detected, and then the transponders begin to communicate. This filtering process, during which no data is recovered by the interrogator, is time intensive when communication is with a large body of transponders. It is also time intensive because it is limited to only a single transponder response per one or more interrogator commands. Similarly, the '570 Patent discloses a system wherein the interrogator signals the transponders when a collision is detected, and the transponders cease communicating for a period of time established by a random number generated within the transponder. As such, the system of the '570 Patent also provides satisfactory results, but also is time intensive when random wait periods exceed the minimal statistical requirements of the transponder population, and therefore is not optimal. Finally, the '603 Patent discloses a system in which each transponder includes circuitry which is able to detect transmissions by other transponders, and each transponder only transmits when it detects no other transmissions. If a transmission by another transponder is detected, each transponder waits a predetermined time before listening for competing transmissions again. Although the '603 Patent provides adequate operation, it requires transponders having additional complexity (and therefore additional cost) for the circuitry required to receive transmissions from the other transponders and is also time intensive when faced with a large body of transponders, and thereby presents certain drawbacks.

Another drawback of conventional RFID systems relates to the spatial range between the interrogator and each transponder. Conventional RFID systems have been designed for a variety of categories of operation, all of which must be approved or licensed by regulatory agencies, e.g., the U.S. Federal Communications Commission (FCC) for systems intended for use in the United States. The FCC has approved conventional RFID systems, without requiring an operator's license, at various frequency bands and with maximum RF power levels specified for each frequency band. In approving such systems, the FCC has placed strict limitations on the carrier modulation and on the mode of signal returned from the RFID transponder. For example, most un-licensed systems may not include any form of RF amplification within the transponder of signals returned by the transponder to the interrogator.

One class of conventional RFID systems, disclosed in U.S. Pat. No. 5,053,774, has focused on reading a single transponder at close range. These systems are commonly known as proximity systems and have been designed to operate at carrier frequencies below 30 MHZ. In systems of this type, the transponder can receive its electrical power from the RF signal of the interrogator and no battery is required in the transponder. There are currently several such systems on the market, including the TIRIS™ system from Texas Instruments, Inc. These systems currently are marketed for security cards, money cards, animal identification, etc. The drawbacks of this type of system are that only a single transponder may be addressed at one time and that the spatial distance between the interrogator and the transponder is very small.

Another class of conventional RFID systems, disclosed in U.S. Pat. No. 5,030,807, has focused on reading a single transponder on moving objects, e.g., for vehicle identification and automatic toll collection. These systems operate at ranges up to 6 meters, but are not designed to read more than one transponder.

A further class of conventional RFID systems, disclosed in U.S. Pat. Nos. 5,640,683, 5,649,295 and 5,649,296 focused on communicating with a plurality of transponders by frequency shift keying (FSK) the backscatter (i.e., reradiated) signal from a particular transponder. A precision (e.g., crystal) oscillator is located on the transponder, and the backscatter antenna of the transponder is voltage controlled by a signal at a frequency derived from that precision oscillator. The resulting reflected signal contains a subcarrier that is offset in frequency from the signal originating from the interrogator. The offset frequency subcarrier signal is itself modulated according to the data being transmitted by the transponder. Although this type of system increases the spatial range between the interrogator and the transponders and allows the background hum due to residual reflection by non-communicating transponders of the signal originating from the interrogator to be filtered away, the data communication rate is quite low (e.g., 1 kbps) because it is necessarily at a low frequency in comparison with the subcarrier.

Yet another class of conventional RFID systems, disclosed in U.S. Pat. No. 5,828,693, has focused on batch reading of transponders using frequency hopping as a spread-spectrum communication means. These systems operate at UHF frequencies (915 MHZ) or microwave frequencies (2.45 GHz or 5.8 GHz) but require complicated frequency hopping circuitry.

Yet a further class of conventional RFID systems, disclosed in U.S. Pat. Nos. 5,539,775, 5,825,806 and 5,974,078, has focused on batch reading of very small transponders at ranges under 2 meters. These systems operate by amplitude modulating and phase modulating a microwave carrier (2.45 GHz or 5.8 GHz), in order to minimize the size of the antennas. However, because each antenna (there could be more than one) is smaller than resonant antennas at lower frequencies, the power received by the antenna is less and the read/write ranges are less than for similar systems operating at lower frequencies. In order to compensate for the weaker signal strength, the RF signal detection and demodulation of the RFID transponder of these systems is considerably more complex than that of the present invention.

The use of a direct sequence spread spectrum (DSSS) signal transmitted from the interrogator to the transponder in RFID systems has been complicated by the need for complex and power intensive demodulation strategies in the transponder. The system disclosed in U.S. Pat. No. 5,974,278 first creates an amplitude modulated signal with the modulation being a direct sequence waveform. The transponder demodulates the received signal in two steps. First, the amplitude modulated waveform is detected by an AM Detector, and the presence of detected signal energy is used to turn on a data correlator, which then processes the baseband direct sequence signal. The system of the '278 Patent is deficient in that it is susceptible to jamming from other on channel carriers, including frequency hopped spread spectrum (FHSS) signals, has long acquisition times (see Column 5, line 60: ". . . several hundred data bit periods."), and requires a high speed onboard clock to clock the onboard PN generators. The system described in the '278 Patent also uses carrier regeneration to return signals to the interrogator and is thus not a reflective transponder.

An alternative to the DSSS system of the '278 Patent is to use the DSSS system and method disclosed in U.S. Pat. No. 5,559,828, which sends a pseudo-noise (PN) code reference together with PN coded data on the in-phase and quadrature phases of the same carrier frequency. With this method, sometimes referred to as a Quadrature Fast Acquisition Spread Spectrum Technology (QFAST®) system, there is no need for the transponder to have an on-board code generator to recorrelate the coded signal to the original data bandwidth. These QFAST® systems demodulate with a simple delay-and-multiply strategy, which may be implemented with passive analog delay components. However, until now the DSSS system and method of the '828 Patent has not been adapted for use in an RFID system.

One problem facing conventional RFID systems is interrogator receiver desensitization caused by the interrogator transmitter itself. Methods to mitigate the deleterious effects of this local strong signal have been described in the field of RADAR and involve a technique called range gating. The first range gating system was implemented on pulsed RADAR. The RADAR illuminator system clamped off the receiver, and sent out a very short burst of high power RF. After the transmitter was shut off, the receiver input was reactivated, and used to listen for the returned pulse. A refinement on this technique opened the receiver for a specific period, beginning after a controllable delay. Then anything received could only have come from an object a known distance away, inside the "range gate". A problem with the pulsed RADAR system was that the power in the transmitted pulse had to be quite high in order for the received signal to have a reasonable signal to noise ratio. The combination of wide receiver bandwidth to accommodate the short pulse, and the brief integration time for a single pulse, ultimately limited the range of early pulsed RADAR systems.

A second range gating system utilized a continuous RF signal whose center frequency was changed continuously. A returned signal even from a stationary object, would have a different frequency than the current transmitted frequency or receiver Local Oscillator. This frequency offset resulted in a synthetic Doppler component in the demodulator output, with the range to the object being "encoded" in the amount of frequency offset. This type of system is referred to as a "chirp" system. While this system overcame the need for high peak power, and provided long integration times, it was easily jammed by the presence of other emitters in the band. Placing a secondary phase modulation on the transmitted signal, which could be checked, reduced the jamming problem. Subsequently, the use of a special digital pattern, called a Barker Sequence, improved the ranging resolution on the signal through its unique auto-correlation properties. Later, with the advent of high speed digital circuitry, it became possible to generate long "pseudo-noise" codes which were deterministic, but which would not repeat on a timescale similar to the expected returning signal. Such systems provided range gating through digital direct sequence modulation. The receiver in such a system utilized both the knowledge of the transmitter center frequency and the displacement of the code phase to provide range gating and Doppler rate determination.

A further problem facing conventional RFID systems is that, in order to read RFID transponders that may be distributed over an area that is considerably larger than the spatial range of a single interrogator antenna assembly, either an interrogator must roam the area or fixed-position interrogators must be positioned in an array located within the area. The latter configuration is preferred in most automated applications. However, if adjacent interrogators in such an array are used simultaneously to read data from transponders in the area, their signals might possibly interfere with each other. Therefore, it is usually necessary to operate the multiple interrogators one at time in a sequential manner. In some applications, a typical floor space may require 500 or more interrogators. If only one interrogator were to be operated at a time, and if each interrogator required several minutes to complete the reading from, or writing to, the RFID transponders within its range, then the entire operation could take several hours to complete. In many situations, it is important to complete this operation as fast as possible so that other tasks can be permitted to resume.

Various objects, advantages and features of the present invention will become readily apparent from the ensuing detailed description and the novel features will be particularly pointed out in the appended claims.

SUMMARY

The present invention is directed to an RFID system comprising a plurality of RFID transponders which each have a unique identification code and which each receive a signal and generate a response signal based on the received signal. Each RFID transponder further includes a random number generator used for determining whether to respond to a received message addressed to all of the RFID transponders. The RFID system further includes a host computer for generating a message for transmission to the RFID transponders and one or more interrogators connected to the host computer which include an interrogator transmitter and an interrogator receiver that operate in half-duplex mode. The interrogator transmitter transmits messages received from the host computer to the RFID transponders during a first part of the half-duplex mode and provides an illumination signal to the RFID transponders during a second part of the half-duplex mode. The interrogator receiver receives signals reflected by the RFID transponders and provides the received signals to the host computer. In operation, the host computer identifies each of the unique identification codes associated with each of the plurality of RFID transponders by iteratively transmitting a message including a variable having a predetermined initial value to each of the RFID transponders. Only the RFID transponders which generate a random number greater than the variable respond to the message by transmitting identification codes associated with the respective RFID transponders. In a preferred embodiment, each of the signals sent between the interrogator and the RFID transponders is transmitted in spread spectrum format. Further, communications between the interrogator and each of the RFID transponders is preferably in TDMA format whereby a predetermined number of time slots are available for transmission. Still further, each of the RFID transponders also use the random number generator to assign a time slot to use for transmission of the response signal. Also, the host computer preferably intelligently adjusts the variable after receipt of each response signal to ensure that an adequate number of responses are received during a next iteration. Finally, the random number generator is also used to generate a unique identification code for each of the plurality of RFID transponders.

A particular aspect of the present invention is a method for a host to read an identification code from RFID transponders each having unique identification codes. First, the host iteratively transmits a read identification code command and a variable having a predetermined initial value to the RFID transponders. Each of the RFID transponders receive the read identification code command and the variable, generate a random number, and compare the variable with the generated random number. If the generated random number is greater than the variable in a particular RFID transponder, that transponder transmits an identification code associated therewith and then becomes inactive such that each RFID transponder does not respond to further read identification code commands during the current read identification code command iteration. If the generated random number is greater than the variable in a particular RFID transponder, that transponder waits for a next transmission of the read identification code command and the variable. Upon receipt of one or more identification codes during a current iteration, the host intelligently adjusts the value of the variable for the next iteration of the transmission of the read identification code command and the variable. The host also examines the variable and ceases the iterative transmission of the read identification code command when no RFID transponders respond by transmitting their identification code in response to a final value of the variable. In a preferred embodiment, the predetermined value for the variable is set as a high value, the step of intelligently adjusting the value of the variable reduces the value of the variable, and the final value is zero. As a related aspect, the host system may have more than one antenna for transmission to the RFID transponders, and the read identification code command is sent on each of the antennas. Upon receipt of a response including an identification code from a particular RFID transponder, the identification code is stored in memory along with information about which antenna was used to transmit the read identification code command. Thereafter, all direct communications to the RFID transponder are made using the associated antenna information.

Another aspect of the present invention is a method for re-selecting an identification code for each of a group of RFID transponders. First, the host transmits a re-select identification code command to each of the RFID transponders. In response, each of the RFID transponders generates a first random number and calculates a new identification code based upon the first random number. Once this is complete, the identification codes are read as described above. As a further enhancement of this aspect, all of the RFID transponders are first received in a state where each has a common identification code, which is useful in testing, batch programming, etc. Upon introduction of a group of RFID transponders to an area, the re-select identification code mode is used to establish a unique identification code for each RFID transponder.

The system of the present invention includes an interrogator which is connected to a host computer for communicating with the RFID transponders. The interrogator comprises one or more antennas, a transmitter connected to one of the antennas for transmitting an FSK modulated spread spectrum signal on that antenna during a transmitting mode and a BPSK modulated spread spectrum signal during a receiving mode, a receiver connected to one of the antennas for receiving a spread spectrum signal in PSK format, and a controller connected to the transmitter and the receiver for controlling the transmitter and the receiver and communicating with a host computer. In an additional aspect, there are two antennas, a first antenna having a first polarization and a second antenna having a second polarization which is orthogonal to the first polarization, and an antenna switch matrix for selecting one of the two antennas for connection to the transmitter and a second of the two antennas for connection to the receiver. In a further aspect, there is a third antenna having a third polarization which is orthogonal to the first polarization and to the second polarization, and the antenna switch selects one of three antennas for connection to the transmitter and a second of the three antennas for connection to the receiver. The transmitter of the interrogator comprises an FSK transmitter section for generating a message for transmission as a spread spectrum output signal in FSK format, a BPSK transmitter section for generating an illumination signal for transmission as a spread spectrum signal in BPSK format, an output amplifier, and a switch which selectively connects the FSK transmitter section or the BPSK transmitter section to the output amplifier. The FSK transmitter section consists of a Manchester encoder connected to the controller, a PN generator connected to the controller, and an FSK modulation generator connected to the Manchester encoder and the PN generator. The BPSK transmitter section consists of a PN generator, a low noise oscillator, and a balanced modulator connected to the PN generator and the low noise oscillator. The receiver comprises a band pass filter having an input connected to the at least one antenna for receiving a signal, a first mixer and a second mixer each having a first input connected in parallel to an output of the band pass filter and a second input connected to a signal derived from a transmitted signal, a first bandpass filter connected to an output of the first mixer, a first data and clock recovery circuit connected to an output of the first bandpass filter for recovering an in-phase version of the received signal, a second bandpass filter connected to an output of the second mixer, and a second data and clock recovery circuit connected to an output of the second bandpass filter for recovering an quadrature-phase version of the received signal.

As a further aspect of the present invention, an antenna assembly for an RFID interrogator is disclosed which comprises a first antenna having a first polarization, a second antenna having a second polarization which is orthogonal to the first polarization, and an antenna switch network connected to the first and second antennas for selectively selecting one of the first and the second antennas for connection to a transmitter. In a preferred embodiment, the antenna assembly further comprises a third antenna having a third polarization which is orthogonal to both the first polarization and the second polarization.

An additional aspect of the present invention is a transponder for communicating with an interrogator in an RFID system, which includes a first antenna element having a first predetermined dimensional configuration, a second antenna element having a second predetermined dimensional configuration, an impedance modulator connected between the first antenna element and the second antenna element which causes the first antenna element to be electrically connected to the second element in a first state and to be electrically isolated from the second element in a second state, a receiver for receiving a message within an FSK modulated spread spectrum signal connected to the first antenna element, the second antenna element and the impedance modulator, and a controller connected to the receiver which receives the message and selectively responds to the message in BPSK format by reflecting an illumination signal transmitted by the interrogator by selectively switching the impedance modulator between the first state and the second state. Preferably, the transponder receiver comprises a frequency discriminator having an input connected to the first and second antenna elements, a bandpass quantizer having an input connected to an output of the frequency discriminator, and a low pass filter connected to an output of the bandpass quantizer. Further, the first predetermined dimensional configuration is preferably a length of one-quarter wavelength and the second predetermined dimensional configuration is preferably a length of three-quarter wavelength. In addition, the first antenna element preferably consists of two first sub-elements connected by a ninety degree angle and have a predetermined length relationship to each other. Also, the second antenna element preferably consists of a plurality of second sub-elements connected by ninety degree angles in a geometrically folding configuration and each of the second sub-elements have a predetermined length relationship to each other. Finally, the first antenna element and the second antenna element together preferably form a dipole configuration.

In yet an additional aspect, a method and apparatus for generating a random number in an RFID transponder is disclosed. In the method, a random seed first is calculated based upon the difference between a local clock signal and a clock signal derived from either a received signal or random noise. Next, the random seed is loaded into a random number generator. Finally a random number is generated based upon the random seed. The apparatus includes a first clock input derived from a local clock oscillator, a second clock input derived from a received signal or random noise, and means connected to the first clock input and the second clock input for generating a random number based upon the timing difference between the first clock input and the second clock input.

In yet a further aspect of the present invention, a method for controlling a plurality of groups of interrogators in an RFID system is disclosed. Each interrogator within a group of interrogators is arranged in nearest neighbor format. Thereafter, only corresponding interrogators within each group of interrogators are activated for transmission of signals to at least one RFID transponder within a zone of covered by the respective activated interrogators.

One particular embodiment of the present invention is an RFID system for tracking election ballots. A plurality of RFID transponders are included in this application. Each of the plurality of RFID transponders has a unique identification code and is connected to a separate ballot. The RFID transponders receive a signal and generate a response signal based thereon. Each of the RFID transponders includes a random number generator used for determining whether to respond to a received message addressed to all of the plurality of RFID transponders and a memory for storing election data. This embodiment further includes a host computer for generating a message for transmission to at least one of the RFID transponders and for controlling the storage of election data within each of the ballots, e.g., during an election. Finally, this embodiment includes at least one interrogator connected to the host computer having an interrogator transmitter and an interrogator receiver which operate in half-duplex mode. The interrogator transmitter transmits messages received from the host computer to the plurality of RFID transponders during a first part of the half-duplex mode and provides an illumination signal to the plurality of RFID transponders during a second part of the half-duplex mode. The interrogator receiver receives signals reflected by the at least one RFID transponders and provides the received signals to the host computer. In this embodiment, the host computer identifies each of the unique identification codes associated with each of the plurality of RFID transponders by iteratively transmitting a message including a variable having a predetermined initial value to each of the RFID transponders, and only the RFID transponders which generate a random number greater than the variable respond to the message by transmitting identification codes associated with the RFID transponders. In an additional aspect of this invention, all of the ballots within one voting group, e.g., a precinct, may be initialized using a main host-interrogator combination prior to an election, and a separate host-interrogator combination may later be used as a separate voting booth.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein:

FIGS. 5, 5A and 5B comprise a flowchart of the READ Tag_ID mode of operation;

DETAILED DESCRIPTION OF THE PREFERRED EMBODIMENTS

The present invention is a system and method by which information is written to or read from as many as several thousand arbitrarily located transponders in a spatial range extending to 20 feet or more from each of a plurality of interrogators using radio communications. The present invention provides for the efficient and reliable location and control of very large numbers of transponders, based upon a particular communication protocol and utilizes radar direct sequence range gating and Time Division Multiple Access (TDMA) communications methods. The use of TDMA provides an improvement over the prior art in several ways, including but not limited to: (1) TDMA separates the timing of all responding transponders into discrete intervals (i.e., time slots) such that partial collisions are avoided; and (2) TDMA permits a multiplicity of transponders to be read in each interrogator frame (the collection of time slots comprising the interrogator command time slot and the plurality of transponder response time slots) thus improving the time efficiency of data collection. The invention can be utilized to track articles in manufacturing, shipping, warehousing, security, retailing industries and the like. Specifically, the invention can be utilized to perform check-in, check-out, inventory, and security surveillance for various types of retail stores such as supermarkets, department stores, warehouse stores, specialty stores, etc. More specifically, the present system can be utilized to perform automatic inventory of articles located on tables or shelves, or hanging from racks, using an array of antennas located in the ceiling of the area in which such articles are located. Other possible applications of the invention include, for example, retail sales in general, delivery control, tracking of in-process goods or manufactured items, electronic article surveillance in general, medical and other records for animals and people, prisoner identification, counterfeit goods detection, etc. Still other possible applications of the invention are in fields where any plurality of low cost tokens are used to represent substantial sums of money, and where it is desired to keep track of said tokens, whether they are by themselves, grouped with similar tokens, e.g., surgical sponges, gaming pieces such as poker chips and election ballots, or attached to other articles in an extended environment, such as a room or building, e.g., postal and shipping labels. For example, in the case of placing a transponder on an election ballot, a memory within the transponder could be used to store election data, thereby simplifying the tabulation of election results.

Figure 1:
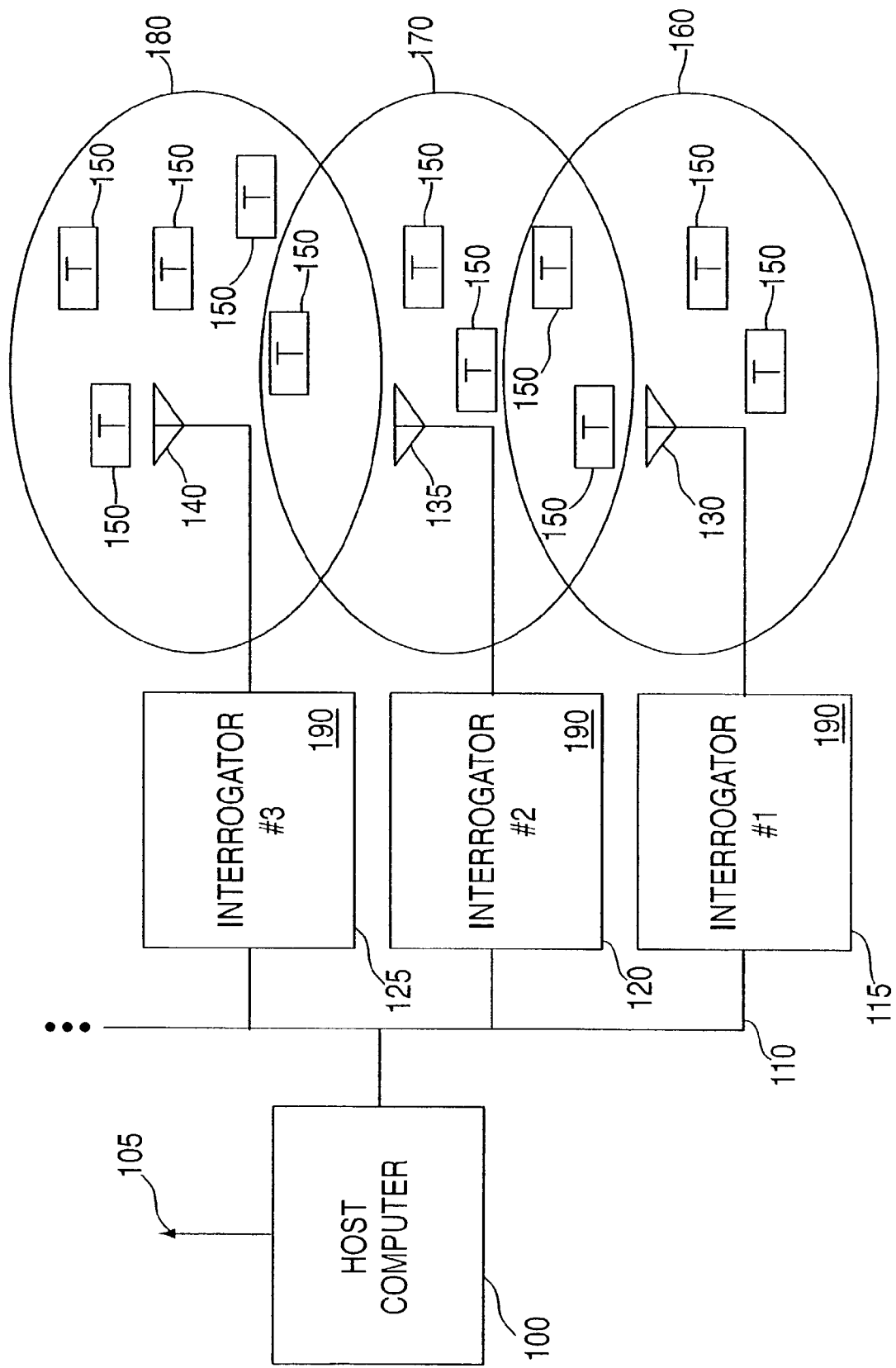
FIG. 1 is a block diagram of the system of the present invention.

Referring now to the drawings, and in particular, FIG. 1, the RFID system of the present invention consists of a host computer 100 which is connected to a plurality of interrogators 190 (e.g., interrogators 115, 120 and 125) by a communications link 110, e.g., a LAN. Host computer 100 includes a connection 105 for establishing connection to other host computers (not shown) for the management of areas which are larger than may be handled by a single host computer 100, e.g., spread out over a plurality of floors or buildings. Each interrogator 190 generates RF signals used to communicate with a plurality of transponders 150 through an antenna array 130, 135 or 140 controlled by the associated interrogator 115, 120 or 125. Each interrogator 115, 120 and 125 has a predetermined spatial area (shown by the three enclosed regions 160, 170 and 180) in which communications with transponders 150 may occur. Therefore, an array of interrogators 190 may be set up to cover areas wider than that covered by a single interrogator 190, as shown by overlapping regions 160, 170 and 180, (e.g., interrogator 115 only communicates with transponders 150 within enclosure 160) and as discussed in further detail with respect to FIGS. 14 and 15. When a plurality of interrogators 190, e.g., interrogators 115 and 120, are used in the system of the present invention, neighboring interrogators 190 are positioned close enough to each other so that the spatial area defining the regions in which each interrogator 190 may communicate with transponders 150 (e.g., the area defined by enclosures 160 and 170, respectively) intentionally overlap, to prevent possible gaps or voids where transponders 150 could be out of communication range with any interrogator 190. Although there are three interrogators 115, 120 and 125 shown in FIG. 1, in the preferred embodiment, as one of ordinary skill will readily recognize, the number of interrogators 190 for a particular installation is selected based upon the size of the area in which the transponders 150 may be present, taking into account the necessary overlap required to prevent communication voids from occurring.

The host computer 100 executes a high level program which provides an interface that allows a user to cause each of the one or more interrogators 190 to perform sequences of simple communications tasks that, when taken together, comprise a complex communications task which either requests information from a transponder 150 or causes a transponder 150 to perform a task. Each interrogator 190 receives commands from host computer 100 over a communications link, e.g., a cable connected to the parallel port of host computer 100, and responds thereto, performing each command in order, and signaling host computer 100 when the command has been performed, whereupon host computer 100 may then issue a next command to interrogators 190. In the present invention, transponders 150 are identified by their transponder identification code ("Tag_ID"). Initially, the Tag_ID is generated internally and automatically by each transponder 150 (FIG. 1) upon receipt of a communication command (i.e., the Reselect Tag_ID Command discussed with respect to FIGS. 2 and 6) from an interrogator 190. As discussed in detail below, to generate a Tag_ID, a random number is generated at each transponder 150 using the clock skew between the associated interrogator 190 and each transponder 150 as a random variable. As discussed in further detail below with respect to FIG. 11, the internally-generated random number in each transponder 150 is also used to select a TDMA time slot for transmission and, in conjunction with the Read Tag_ID mode discussed with respect to FIGS. 2 and 5, to determine when to transmit. After the Tag_IDs are generated for each transponder 150 and stored in memory in host computer 100, communications may be made directly with each transponder 150 using the associated Tag_ID as an address for the particular transponder 150.

Figure 2:
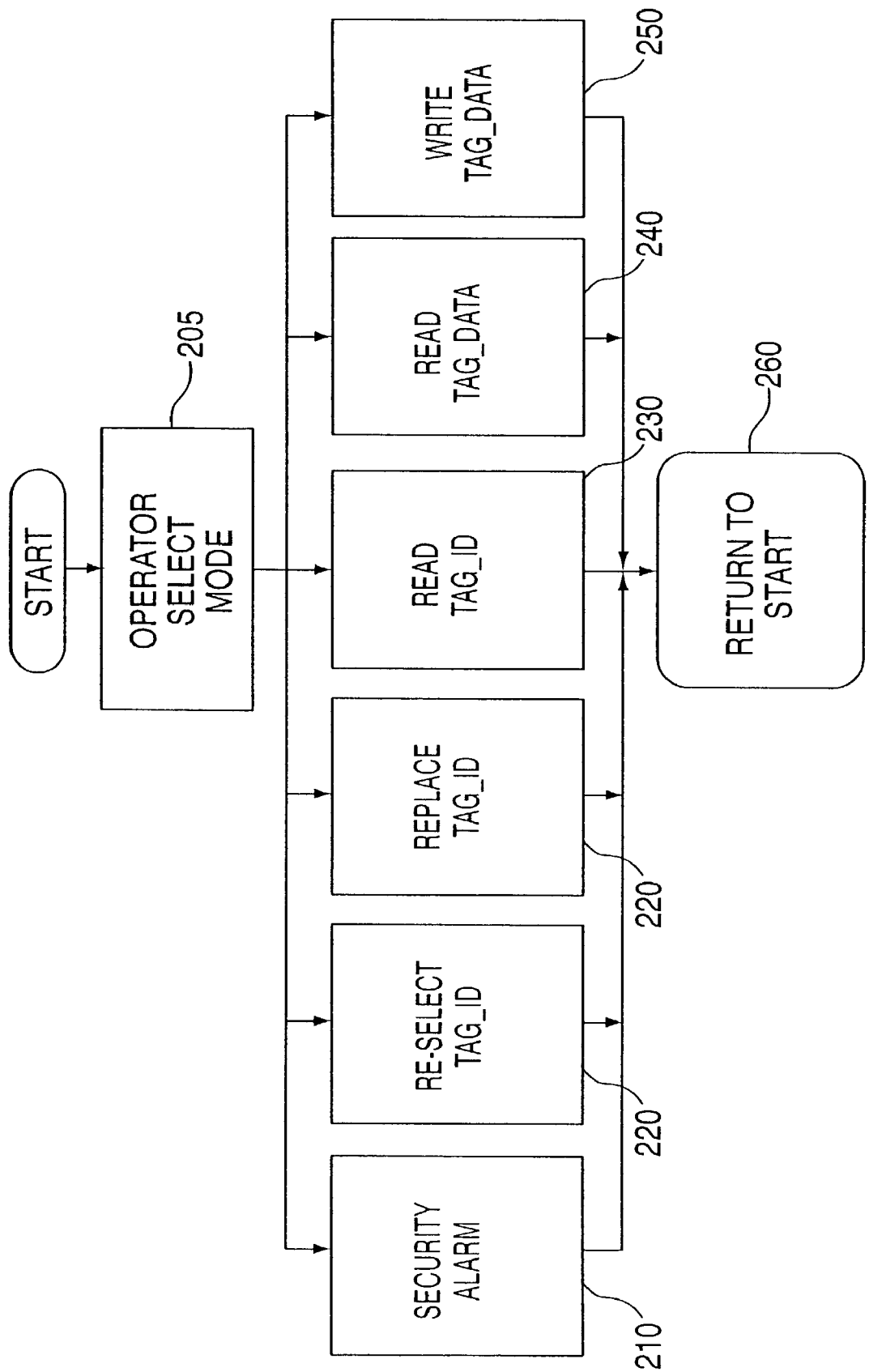
FIG. 2 is a flow chart detailing the six modes of operation of the system.

Referring now to FIG. 2, in the preferred embodiment of the present invention, six modes of operation are used to accomplish all of the needed communications with transponders 150. As one of ordinary skill in the art will readily recognize, additional modes are easily added to provide increased functionality. In the preferred embodiment, as shown in the flowchart of FIG. 2, the modes which each interrogator 190 (FIG. 1) can perform at the request of an operator (user) (step 205) include: (1) Security Alarm 210; (2) Re-Select Tag_ID 220; (3) Replace Tag_ID 270; (4) Read Tag_ID 230; (5) Read Tag_Data 240; and (6) Write Tag_Data 250. In operation, the user (operator) selects the mode in step 205, and the system carries out the operations needed to perform the selected mode (i.e., one of steps 210, 220, 270, 230, 240 or 250) and then returns to a waiting loop for the selection of the next mode at step 260.

Each mode of operation consists of a series of steps, usually iterative, involving communications between host computer 100, one or more interrogators 190 and a plurality of transponders 150. Each mode of operation includes an associated command that is transmitted from host computer 100 to transponders 150, through interrogators 190. One or more transponders 150, depending on the mode of operation, respond to the received command by transmitting a response that is received by an interrogator 190 and passed to host computer 100. The flowcharts in FIGS. 4-9 have been simplified to merely show the interaction between host computer 100 and transponders 150, but as specifically described above and as understood by one of ordinary skill in the art, each communication from host computer 100 to one or more transponders 150 is first passed to one or more interrogators 190 for transmission to transponders 150, and each communication from a transponder 150 to host computer 150 first is received by an interrogator 190 and then passed to host computer 100. Further, as one of ordinary skill in the art will readily recognize, the flow charts are highly simplified representations intended to outline each mode, and the specifics of each mode are discussed in greater detail herein.

Figure 3:
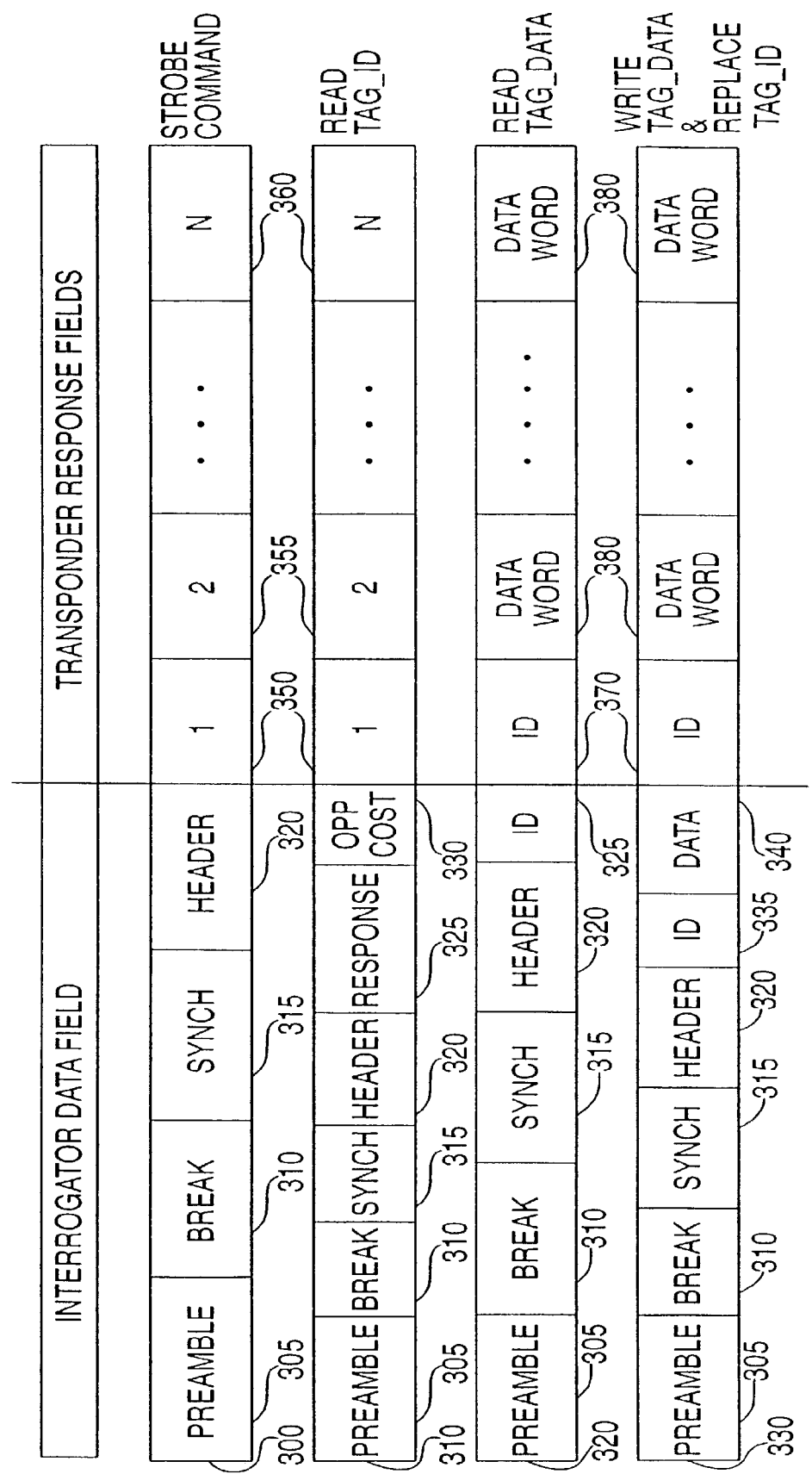
FIG. 3 is a chart of the message structure of the six modes of operation.
Figure 4:
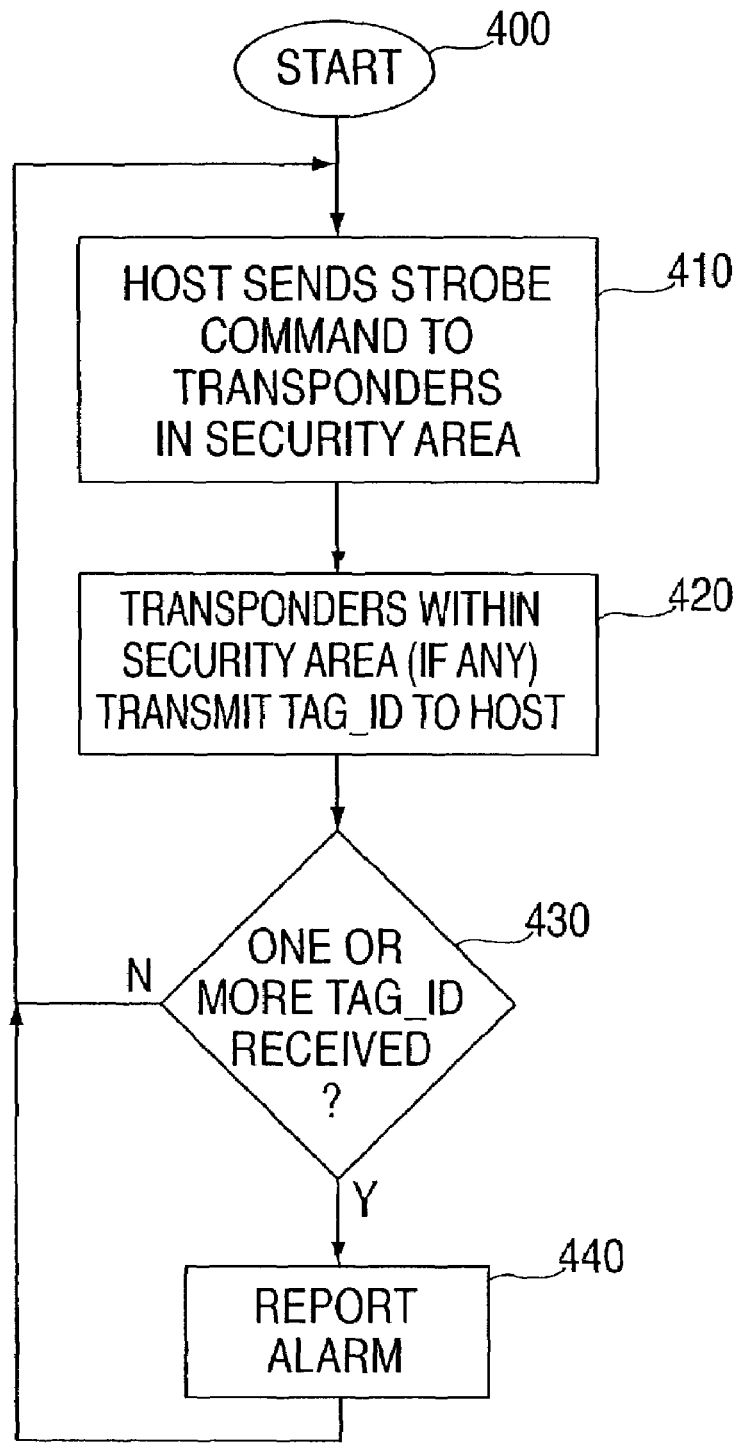
FIG. 4 is a flowchart of the Security Alarm mode of operation.

Referring now to FIGS. 3 and 4, the Security Alarm mode is used to assist in electronic article surveillance. In a typical application for an RFID system, transponders 150 are connected to an article, e.g., goods in a store ("a tagged article"). Areas where tagged articles are not allowed, e.g., a restroom or an exit doorway, are designated security areas and each such security area has a dedicated interrogator 190 mounted therein that constantly transmits the Strobe command. The Strobe command is used for different purposes in the present invention, upon receipt of the Strobe command, a transponder 150 will transmit its Tag_ID, latch the previous command and clear its deselected status. When a tagged article enters a security area, the associated transponder 150 receives the Strobe command and responds by transmitting its Tag_ID (among other actions taken by transponder 150), which causes host computer 100 to trigger an alarm which, as one of ordinary skill in the art will readily recognize, may be either audible or silent.

In operation, host computer 100 sends the Strobe command to an interrogator 190 associated with a security area and the interrogator 190 transmits the Strobe command to any transponder 190 in the security area (step 410 in FIG. 4). The format of the Strobe command is shown in line 300 of FIG. 3, and includes a preamble field 305, a break field 310, a synch field 315 and a header field 320. The header field 320 carries the information designating the particular command being transmitted, in this case the Strobe command. Upon receipt of the Strobe command from host computer 100, an interrogator 190 transmits the Strobe command within the security area (i.e., the interrogator illuminates the security area) (step 410). If present, any transponder 150 within the security area receives the Strobe command and, in response, transmits a message including its Tag_ID to host computer 100 (step 420). Host computer 100 determines whether any responses have been received from any transponders 150 within the security area (step 430). If a response has been received, host computer 100 reports an alarm (step 440), and reverts to the start, to continue looking for additional transponders 150 which might appear within the security area. If no response was received, host computer 100 also reverts to the start, but without setting the alarm.

As discussed in further detail below with respect to FIGS. 10A and 10B, transponders 150 of the present invention do not actively generate a transmission signal, but rather reflect a signal being transmitted by an interrogator 190. Therefore, whenever interrogator 190 transmits a command that requires a response by one or more transponders 150, it then transmits an illumination signal during which it listens for a response from a transponder 150, e.g., step 420 in FIG. 4.

Preferably, each transponder 150 that receives a Strobe command transmits its Tag_ID to an interrogator 190 in each of a predetermined number of successive TDMA time slots (i.e., slots 1 (350), 2 (355), to N (360) in transponder response field 300 in FIG. 3). Thereafter, if the same Tag_ID is read in a predetermined number of successive time slots 350 to 360, then the Tag_ID is logged and an alarm is triggered (step 440). For example, in the presently preferred embodiment, each transponder 150 that receives a Strobe command returns its Tag_ID to the interrogator 190 sixteen times over a period of sixty milliseconds (i.e., N is equal to 16 in transponder response field 300 in FIG. 3). In a further aspect of the preferred embodiment, if colliding signals are received in each of the predetermined number of successive time slots (a result of more than one transponder 150 in the security area), then an alarm may be triggered without logging any Tag_IDs.

Referring now to FIGS. 3 and 5, the Read Tag_ID mode of operation allows the host computer 100 to communicate with a large plurality of transponders 150 efficiently and with a greatly reduced incidence of communications collisions. In overview, this is accomplished through the use of a controlled variable ("Opp_Cost"), which is set to a predetermined value initially and varied in operation by host computer 100 and which is transmitted to each transponder 150 along with the Read Tag_ID command. When each transponder 150 receives the Read Tag_ID command and the associated Opp_Cost, it generates a random number and compares it to the received Opp_Cost. Based upon the results of such comparison, a transponder 150 either transmits its Tag_ID to an interrogator 190 or it waits for the next transmission of the Read Tag_ID command (where the associated Opp_Cost value may be adjusted slightly and a new random number is generated in any event). In one embodiment, the initial Opp_Cost is set to a high value by host computer 100 and each transponder 150 only transmits its Tag_ID when its value is greater than that of the received Opp_Cost. Before the transmission of the next Read Tag_ID command, the Opp_Cost may be adjusted slightly downward, if the number of Tag_IDs received in the immediately prior step falls below a predetermined threshold. As one of ordinary skill in the art will readily recognize, numerous other schemes may be used to determine which of the plurality of transponders 150 respond to each transmission of the Read Tag_ID command, e.g., if the Opp_Cost is set initially to a low value only transponders having a Tag_ID less than the Opp_Cost would initially transmit or if the Opp_Cost were set to a median value, only transponders having a Tag_ID within a predetermined range of the Op_Cost would initially transmit.

Referring specifically to the data format for the Read Tag_ID command in line 310 of FIG. 3, there are two added data fields over the Strobe command format in line 300, the Opp_Cost field 330 and the response field 325. The response field 325 is used to signal a transponder 150 that its previous transmission of its Tag_ID was properly received. As discussed in further detail below, the use of a TDMA format allows a predetermined maximum number of transponders 150, sixteen in the preferred embodiment, to respond in a single frame (i.e., to a single transmission of the Read Tag_ID command). Therefore, response field 325 must be able to signal each of the predetermined number of transmitting transponders 150 that it received its previous signal. Preferably, each transponder 150 transmits its Tag_ID two times and, upon verification that its second transmission was received by interrogator 190, it becomes inactive (deselected).

In the preferred embodiment, the Opp_Cost value is initially set high and is decremented as more and more transponders 150 are read successfully, based upon the number of transponders 150 responding in each previously successive iteration. When transponders 150 receive a Read Tag_ID command including an Opp_Cost value, each transponder 150 compares the received Opp_Cost with a locally-generated random number. Each transponder 150 sends its Tag_ID only if its random number is larger than the Opp_Cost value, otherwise it waits for the next transmission from host computer 100. Consequently, the number of responses of a large population of transponders 150 is greatly reduced by the comparison with the Opp_Cost value.

In this approach, host computer 100 monitors the number of transponder 150 responses to each Read TAG_ID transmission (since communication is in TDMA format, there will be a plurality of responses to each such transmission), and when the number of responses drops below a predetermined number (preferably four when, as in the preferred embodiment, there are sixteen TDMA time slots), the Opp_Cost is decremented to allow the number of responses to increase in the next transmission. As one of ordinary skill will readily recognize and as discussed briefly above, there are various different methodologies in which the Opp_Cost value may be used to maximize the number of transponders 150 read in each TDMA frame, while reducing the probability of collision. In one additional alternative embodiment, a measure of collisions, coupled with a binary search, is used to set the Opp_Cost to optimally fill the TDMA time slots available. In a further additional alternative embodiment, an independent measure of the population of transponders 150 is generated, e.g., when the system is re-inventorying a group of articles having transponders 150 attached thereto, and the Op_Cost is varied based upon that independent measure.

All of the foregoing methodologies are dependent on distinguishing between collisions and non-responses in each TDMA time slot. Since the interrogator 190 is in control of the timing of responses from the transponders 150, it knows when the transponders 150 are permitted to respond and when they are not responding. The technique for determining if collisions have occurred consists of sampling the relative power in the analog baseband channel of the interrogator's 190 receiver separately for each time slot and also at a time outside the time slot. The sample measured outside the response time slot is representative of the "no response" background reference power level. Next the ratio of the relative power in each time slot to the reference value is computed. If the ratio is unity (approximately) the time slot is declared vacant. If the ratio exceeds one by a preset threshold amount, the time slot is declared occupied. Using this information, together with the knowledge of which time slots produced an accepted response message, the following decisions can be made:

1. If a time slot is declared occupied, and the response message in that time slot is not accepted, a collision is inferred.
2. If a time slot is declared vacant and no response message is accepted, a non response is inferred.
3. The other two cases represent message acceptance.

The collection of these three measures on a frame by frame basis provides the necessary and sufficient input for optimally determining what Opp_Cost setting to use in the next frame transmitted by host 100. As one of ordinary skill in the art would readily recognize, various additional methodologies for setting and varying the Opp_Cost may likewise be implemented.

As a further aspect of the present invention, for the Tag_ID of a particular transponder 150 to be accepted as read successfully, it must be read twice (i.e., each transponder 150 must transmit its Tag_ID during two different message transmissions). In the message field received by a transponder 150 during the next transmission of the Read_ID command after transponder 150 has sent its Tag_ID, i.e., response field 325 in Read Tag_ID message 310, transponder 150 looks for a response bit in the response field that corresponds to the time slot in which that particular transponder 150 transmitted its Tag_ID. If that response bit is affirmative, i.e., an acknowledgment or ACK, transponder 150 increments an internal counter. As soon as transponder 150 receives two such acknowledgments, it becomes inactive (deselected).

Figure 5A:
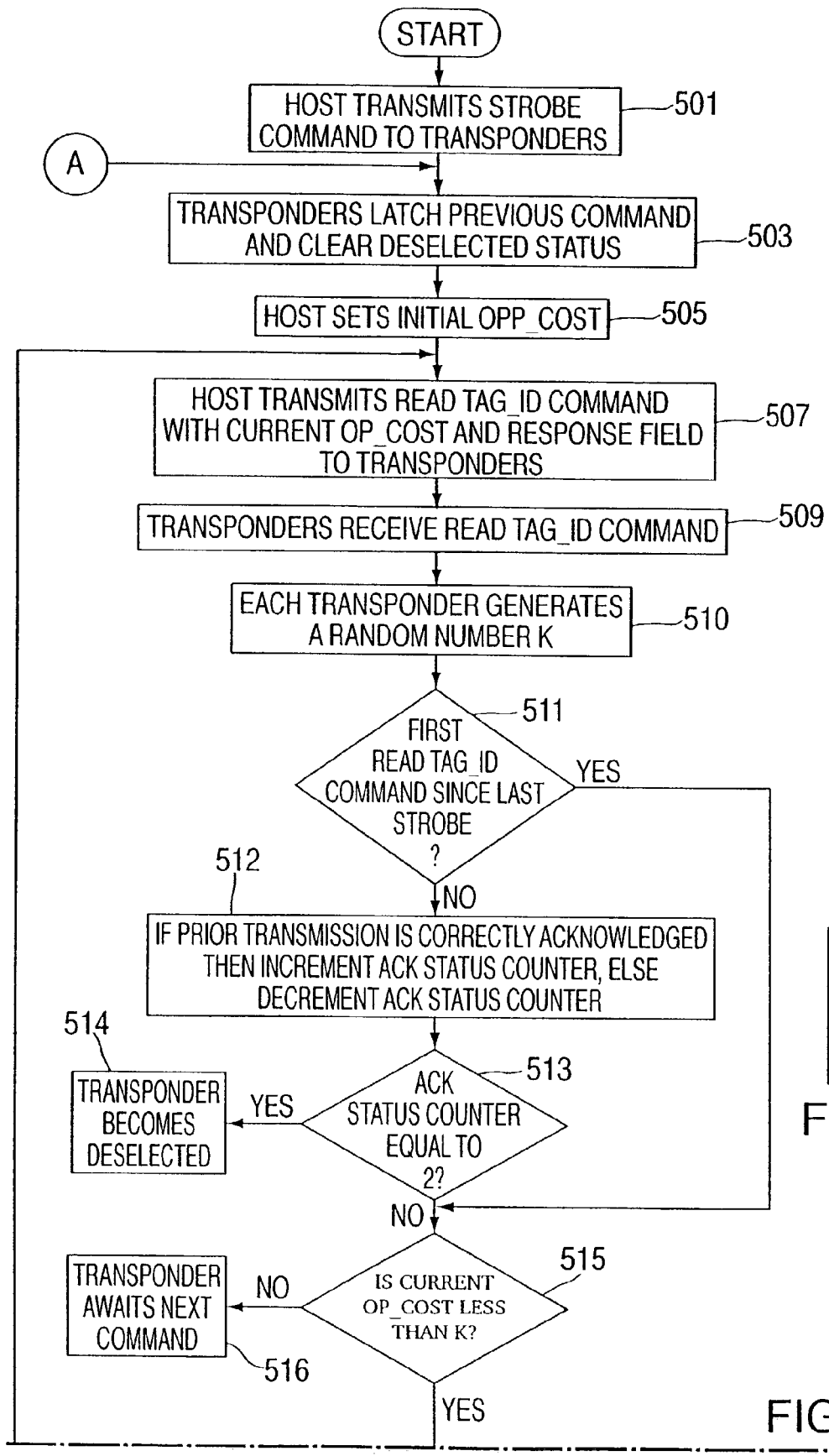
Figure 5B:
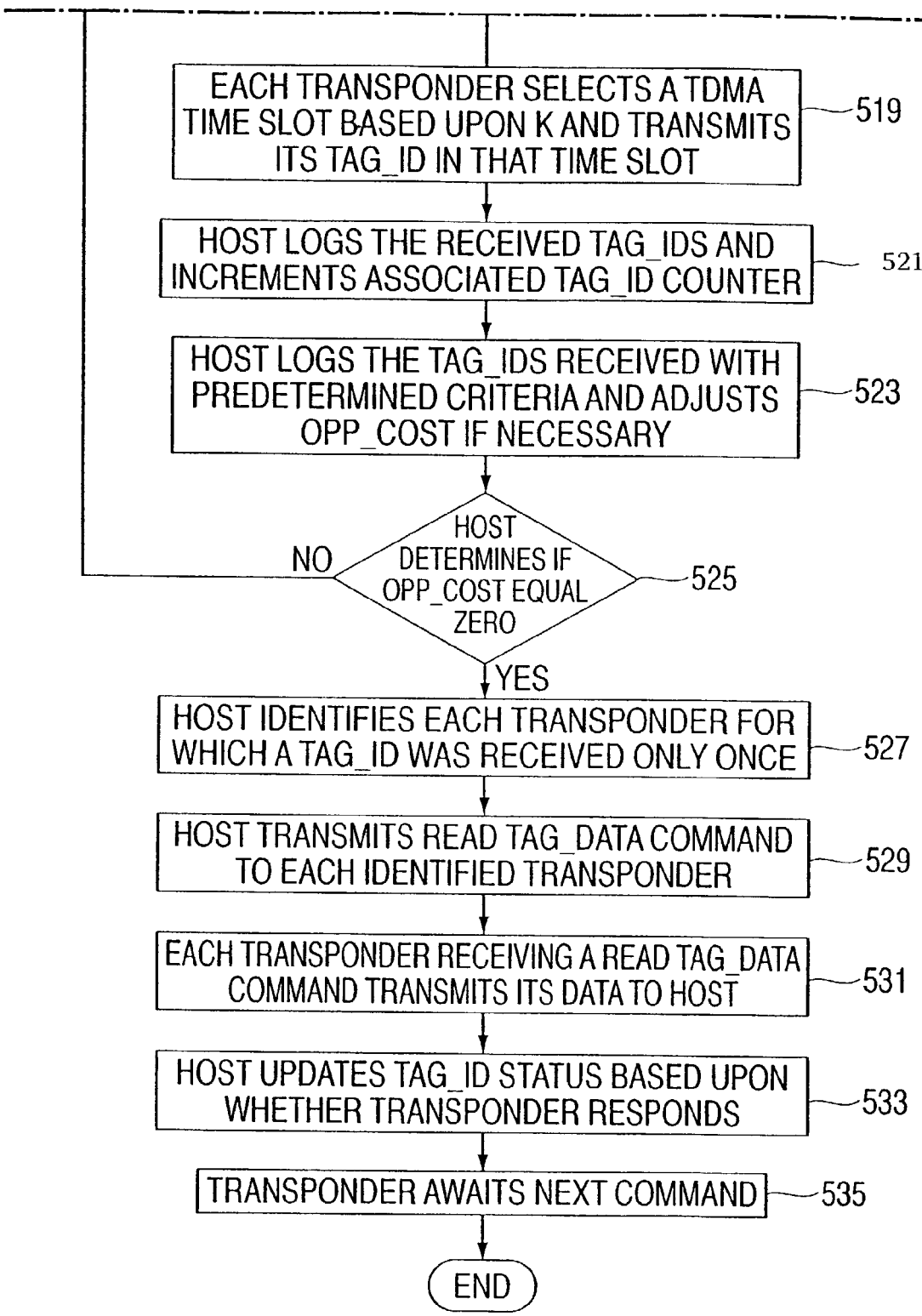
Figure 8:
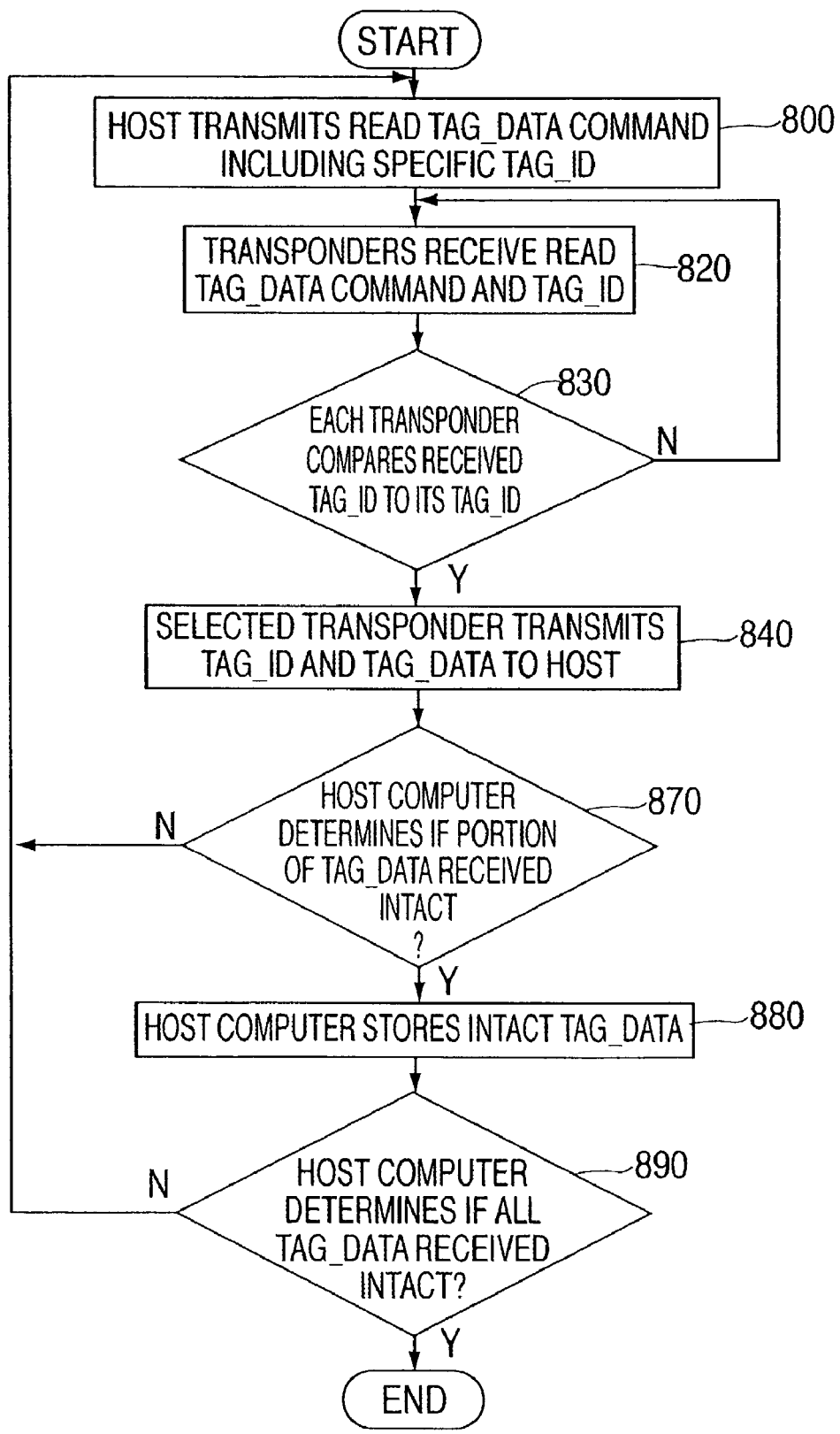
FIG. 8 is a flowchart of the Read Tag_Data mode of operation.

Referring now to the flowchart of FIGS. 5, 5A and 5B, the particular steps performed in the preferred embodiment in carrying out the Read Tag_ID mode are disclosed. Upon initiation, host computer 100 passes a Strobe command to each transponder 150 (step 501). Upon receipt of a Strobe command, each transponder 150 executes any pending operations awaiting a Strobe command (i.e., causes the previously received command operation to be completed, if necessary), and clears transponder 150 from its deselected status, meaning it is no longer deselected (step 503). Each transponder 150 also transmits its Tag_ID immediately in response to the Strobe command, as discussed above, but in this case this transmission is ignored. In this mode of operation, once a transponder 150 transmits its Tag_ID twice, and has twice received acknowledgment, it becomes deselected and no longer responds to received Read Tag_ID commands. Host computer 100 next sets the initial Opp_Cost value (step 505), and passes the Read Tag_ID command (which is in the format shown as field 310 in FIG. 3 and which includes the current Opp_Cost 330 and the response field 325, i.e., the acknowledgment (ACK) or non-acknowledgment (NAK) of previous reception for each of the TDMA time slots) to transponders 150 (step 507). Each transponder 150 within a predetermined distance from a transmitting interrogator 190 receives the Read Tag_ID command (step 509) and, in response, each transponder 150 generates a random variable K (step 510). If a transponder 150 determines that this is the first Read Tag_ID command since the last Strobe command, then processing skips down to step 515, otherwise processing proceeds to step 512. In step 512, each transponder 150 which transmitted its Tag_ID in response to the immediately prior Read Tag_ID command examines response field 325 to determine if the transmission was successful, and if so, updates its response counter. If the count on a response counter within a transponder 150 equals two (step 513), that transponder 150 sets its status as deselected (step 514). Each transponder 150 next determines, in the preferred embodiment, if the Opp_Cost is less than the internally generated random variable K (step 515). If it is not, then that transponder 150 simply awaits the next transmission from the host computer 100 (step 516). If the Opp_Cost is less than K, each transponder 150 then, based upon the value of K, determines the appropriate TDMA time slot and transmits its Tag_ID in one of the time slots 1 (350) to N (360) shown in FIG. 3 for the Read Tag_ID response field (step 519). Host computer 100 receives and logs the Tag_IDs (up to a maximum equal to the number of available TDMA time slots, i.e., N in FIG. 3), incrementing the count for each received Tag_ID (step 521). Host computer 100 next updates the Opp_Cost value by identifying the number of Tag_IDs received in the current iteration and comparing that number to predetermined conditions, e.g., a minimum number, and if less than the predetermined number, adjusting the Opp_Cost downwards appropriately (step 523). After adjusting the Opp_Cost, host computer 100 compares the updated Opp_Cost to a predetermined number, zero in the preferred embodiment (step 525). Of course, as one of ordinary skill in the art will readily recognize, the predetermined number depends on the initial value and variation methodology of the Opp_Cost value. In the preferred embodiment, while the Opp_Cost remains greater than zero, there may be transponders 150 which have not yet successfully communicated their Tag_ID twice. Therefore the processing loops back to step 507 to begin another Read Tag_ID iteration. If the Opp_Cost equals zero, all transponders 150 have either successfully communicated their Tag_ID twice or they have encountered some type of communication lapse. Therefore, host computer 100 next identifies each transponder 150 which successfully communicated its Tag_ID only a single time (step 527), and for each identified transponder 150, the host computer passes a Read Tag_Data command, which, as discussed below with respect to FIG. 8, is specifically addressed to a particular transponder 150 (step 531). If the transponder 150 succeeds in providing the appropriate response, including its Tag_ID, the counter associated with that transponder 150 in host computer 100 is incremented, indicating that the Tag_ID is valid (step 533). If there is no valid response to the Read Tag_Data command, the Tag_ID is considered invalid, and is deleted from the list (step 533).

Figure 6:
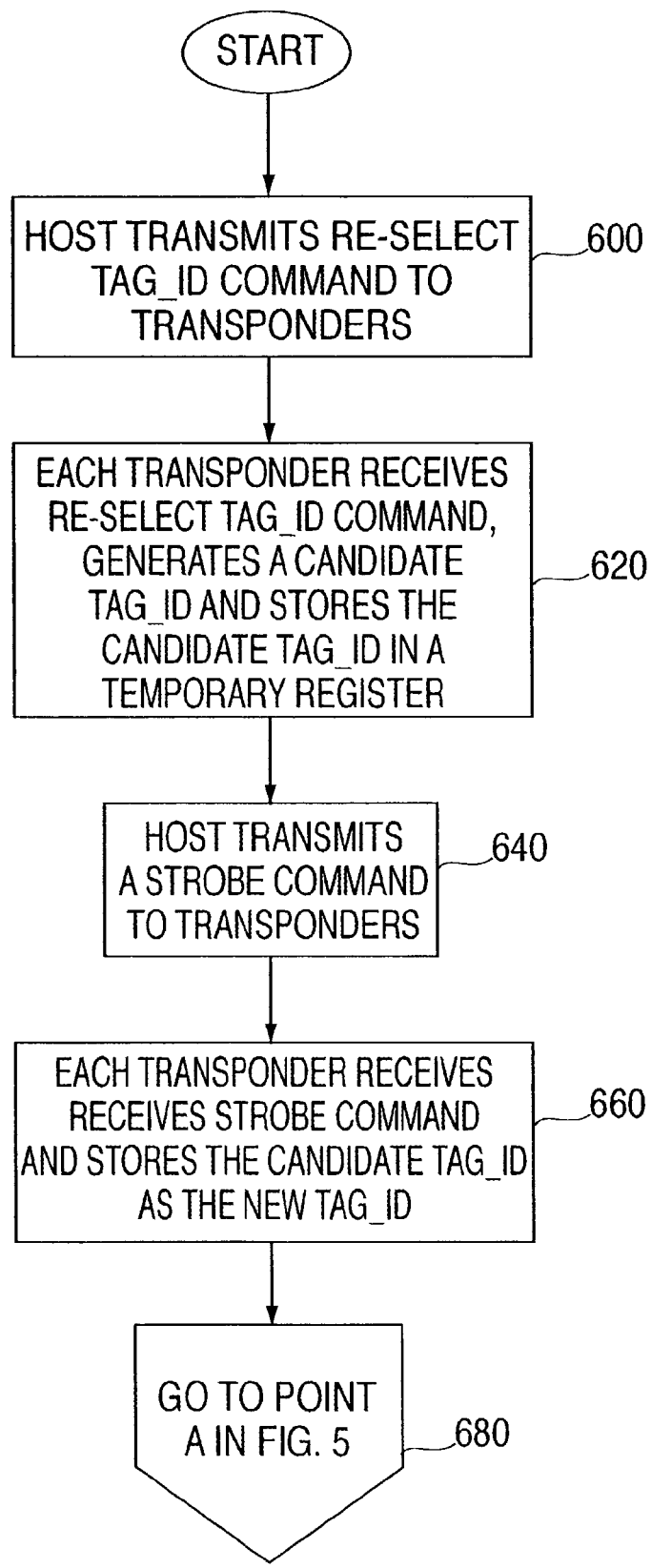
FIG. 6 is a flowchart of the Re-select Tag_ID mode of operation.

It is important to note, as discussed in detail below, that each transponder 150 of the present invention is manufactured identical to each other transponder 150, and does not require preprogramming of any sort. Each transponder 150 has a common default Tag_ID and common default Tag_Data as manufactured, which are available immediately upon power-up of the transponder 150. As understood by one of ordinary skill in the art, this feature allows batch testing and programming of the transponders 150, before they acquire a unique Tag_ID after completion of the Reselect Tag_ID mode. In order to achieve uniqueness, each transponder 150 generates a random Tag_ID number based upon an internally generated random number in response to an initial Re-select Tag_ID command (FIG. 6). As demonstrated above, once generated, this random number-based Tag_ID is communicated to host computer 100 during a Read Tag_ID process, and thereafter permits host 100 to subsequently address only that specific transponder using the associated Tag_ID. If, in the course of time, an article arrives having a transponder 150 possessing the same Tag_ID as another transponder 150 currently within the population of transponders 150, host computer 100 can cause groups or individual transponders 150 to select a new Tag_ID. This is achieved by performing a Re-select Tag_ID command (FIG. 6) (which includes part of the Read Tag_ID processing of FIG. 5). In particular, as shown by the flowchart of FIG. 6, host computer 100 transmits the Re-Select Tag_ID command to transponders 150 (step 600). Each transponder 150 which receives the Re-Select Tag_ID command generates a new candidate Tag_ID, which is based upon a random number, and stores it in temporary memory (step 620). Shortly afterwards, host computer 100 transmits a Strobe command (step 640) and each transponder stores the candidate Tag_ID as its new Tag_ID (step 660). At this point, there exists a population of transponders 150 having separate Tag_IDs, based upon the use of internally generated random numbers in each transponder 150 to generate the Tag_ID. Processing next proceeds to point A in FIG. 5, where the Read Tag_ID processing essentially begins, so that the Tag_ID of each transponder 150 within the population is identified and stored in memory within host computer 100, in the manner discussed above.

Figure 7:
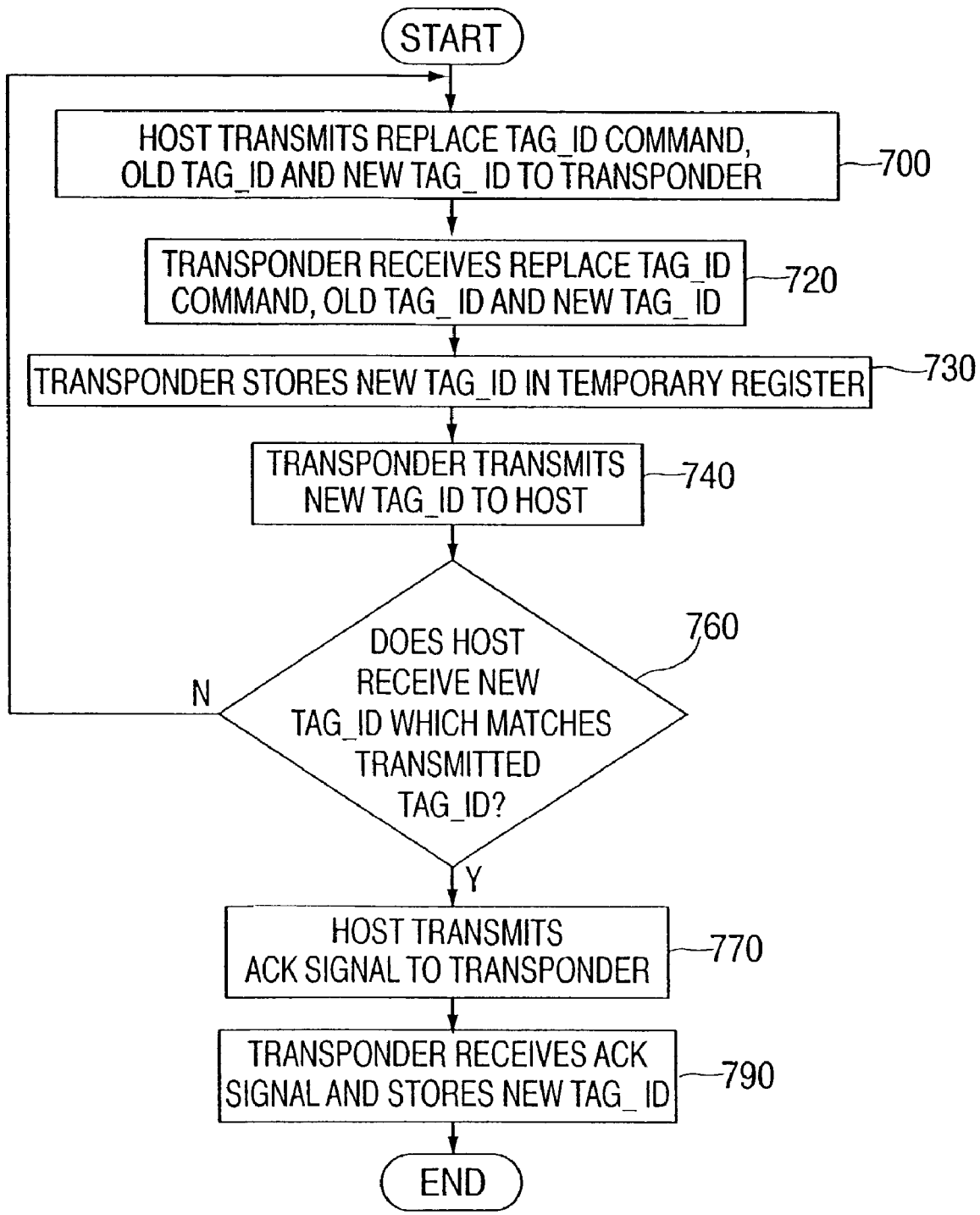
FIG. 7 is a flowchart of the Replace Tag_ID mode of operation.

In the event that it is found that the Tag_ID of a particular transponder 150 is identical to an existing Tag_ID stored in memory in host computer 100, the Replace Tag_ID command may be used to replace the duplicate Tag_ID with a separate and distinct Tag_ID (FIG. 7). The identification of a duplicate Tag_ID must be made prior to allowing the tagged article having a duplicate Tag_ID to join the population of tagged articles containing its duplicate, e.g., there must be a staging area having a dedicated interrogator 190 which is used to identify the Tag_IDs (using the Read Tag_ID command) of tagged articles that are to be added to the general population of tagged articles. The duplicate Tag_ID must be replaced prior to allowing the associated article to join the population containing its duplicate, or else it will be necessary to enter the Replace Tag_ID mode, since there is no provision for a single interrogator 190 to address only one of two transponders 150 having the same Tag_ID to replace the Tag_ID in only one of the transponders 150. In particular, referring now to the flowchart of FIG. 7, the particular steps performed in the Replace Tag_ID mode are shown. First, host computer transmits a Replace Tag_ID command, including the old Tag_ID and the new Tag_ID, to the particular transponder 150 (step 700), in the format shown in field 330 in FIG. 3, wherein the new Tag_ID is transmitted as data in field 340 and the old Tag_ID is used to address the transponder 150 in field 335. Transponder 150 receives the Replace Tag_ID command, along with the old Tag_ID and the new Tag_ID, in step 720 and stores the new Tag_ID in a temporary register therein (step 730). Transponder 150 then transmits the new Tag_ID to the host computer 100 (step 740). Host computer 100 receives the new Tag_ID from the transponder and compares it to the transmitted new Tag_ID (step 760). If host computer 100 determines that the transmitted new Tag_ID is not the same as the received new Tag_ID (indicating that an error occurred at some point), processing reverts to step 700 and the new Tag_ID is resent in a new Replace Tag_ID command. Otherwise, when the received new Tag_ID matches the transmitted new Tag_ID, processing moves to step 770, where an acknowledge signal (ACK) is transmitted to transponder 150. Upon receipt of the acknowledge signal, transponder 150 sets the stored Tag_ID as its new Tag_ID, completing the Replace Tag_ID process.

Referring now to the flowchart of FIG. 8, the Read Tag_Data process, i.e., the steps required to read data ("Tag_Data") from a transponder 150, is shown in detail. As discussed above, in order to read Tag_Data from a transponder 150, the Tag_ID of the transponder 150 must be stored in memory within host computer 100. As one of ordinary skill will readily recognize, host computer 100 may obtain knowledge of the Tag_IDs from a variety of sources, such as prior Read Tag_ID commands, e-mail from a larger (external) database, scanned barcodes, etc. The message structure of the Read Tag_Data command is illustrated in FIG. 3 as command 320, and includes a preamble field 305, a break field 310, a sync field 315, a header field 320 and a Tag_ID field 325. The addressed transponder 150 responds with its Tag_ID 370, followed by Tag_Data 380, preferably in 16-bit increments. In particular, to perform the Read Tag_Data process, host computer 100 first transmits a Read Tag_Data command addressed to a particular transponder 150 (step 800). All transponders 150 receive the Read Tag_Data command, including the addressed Tag_ID, (step 820) and compare the received Tag_ID to their own Tag_ID (step 830). If the received Tag_ID does not compare to the Tag_ID of the transponder 150, that transponder simply awaits the next command from host computer 100 (step 800). If the received Tag_ID is the same as the Tag_ID of the transponder 150, processing proceeds to step 840, where the addressed transponder 150 transmits its Tag_ID and its Tag_Data to the host computer 100. Host computer 100 receives the Tag_ID and Tag_Data and determines if the Tag_Data has been received intact using conventional error detection techniques (step 870). If no portion of the Tag_Data has been received intact, processing reverts to step 800 where the Read Tag_Data command is re-transmitted by host computer 100. If some portion of the Tag_Data has been received intact, processing proceeds to step 880, where the intact portion of the Tag_Data is stored. Next, host computer determines if all of the Tag_Data has been received intact (step 890). If it has not been received intact, processing also reverts to step 800 where the Read Tag_Data command is retransmitted by host computer 100. If all of the Tag_Data has been received intact, then processing is complete for this Read Tag_Data process.

Figure 9:
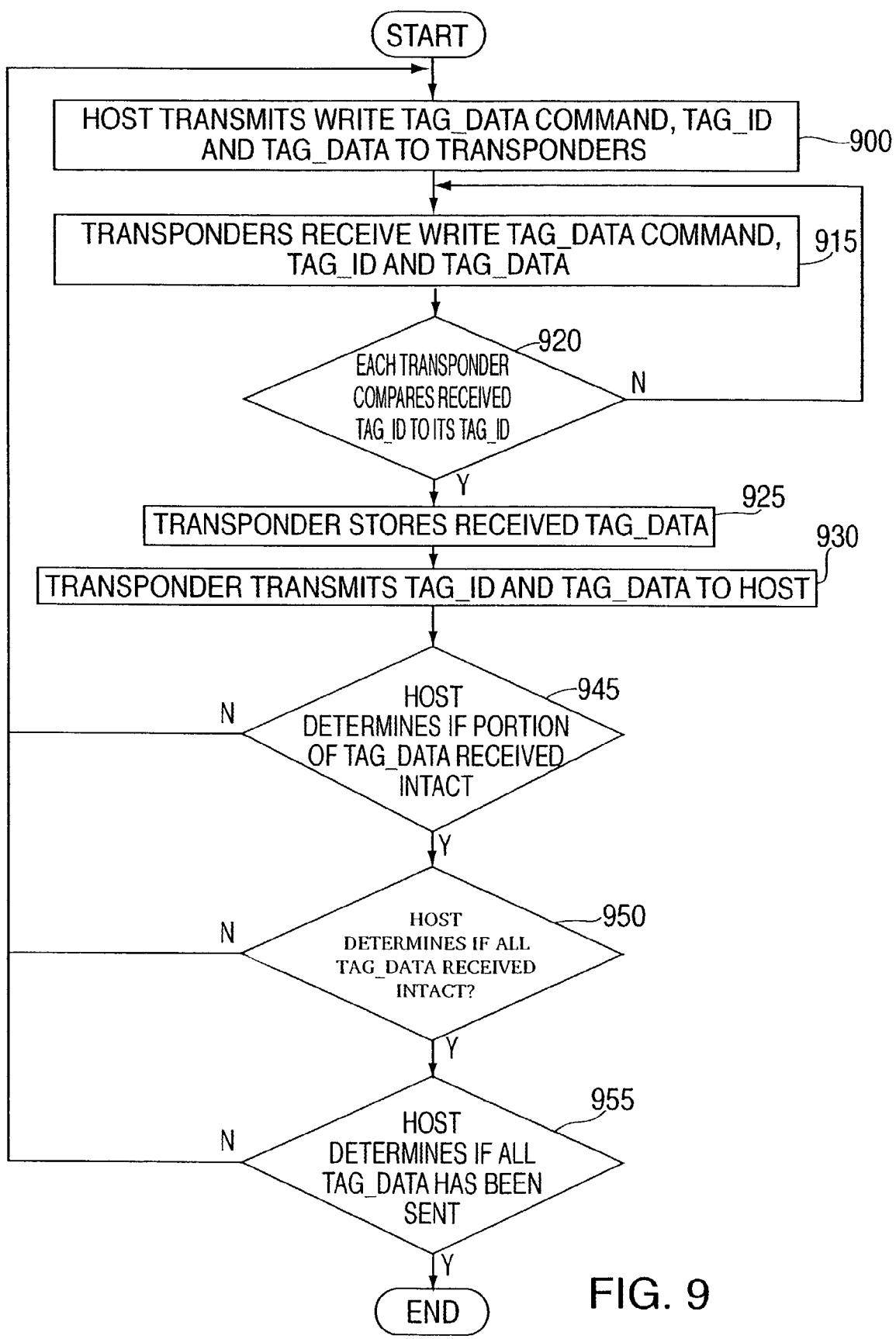
FIG. 9 is a flowchart of the Write Tag_Data mode of operation.

Referring now to the flowchart of FIG. 9, the Write Tag_Data process is shown in particular detail. In the present embodiment, Tag_Data is written to a specific transponder 150 in 12-bit increments. The message structure 330 of the Write Tag_Data command is illustrated in FIG. 3, and includes a preamble field 305, a break field 310, a sync field 315, a header field 320, a Tag_ID field 325 and a Tag_Data field 340. In the present embodiment, the upper 8-bits of header field 320 contain the memory location in transponder 150 to which the received Tag_Data is to be written. Each transponder 150 includes N 12-bit memory locations (N is equal to four in the preferred embodiment) that are used to store Tag_Data. Once the addressed transponder 150 has stored the current 12-bit increment, it transmits the full contents thereof back to host computer 100 for confirmation. After N successful exchanges between host computer 100 and transponder 150, all N×12 data bits will have been successfully transferred to transponder 150.

To perform the Write Tag_Data process, host computer first transmits the Write Tag_Data command, which includes the Tag_ID for the particular transponder 150 and the Tag_Data, to all transponders 150 (step 900). Each transponder 150 receives the Write Tag_Data command (step 915), and compares the received Tag_ID to its Tag_ID (step 920). If there is no match, the transponder 150 waits for the next command from host computer 100 (step 900). If there is a match, transponder 150 stores the received Tag_Data (step 925) and transmits its Tag_ID and the stored Tag_Data back to host computer 100 (step 930) for verification. Host computer 100 receives the Tag_ID and Tag_Data and determines if a portion of the received Tag_Data was received intact (step 945). If no portion was received intact, processing reverts to step 900 where the last Write Tag_Data command is retransmitted to transponders 150. If a portion of the received Tag_Data was received intact, processing continues to step 950, where it is determined if all of the received Tag_Data was received intact. If not, again, processing reverts to step 900 where the last Write Tag_Data command is re-transmitted to transponders 150. If the all of the currently received Tag_Data was received intact, processing continues to step 955, where host computer 100 determines if there is additional Tag_Data for transmission to the currently addressed transponder 150. If so, an appropriate index is incremented to signal that the next portion of Tag_Data is to be transmitted, and processing reverts to step 900 where the Write Tag_Data command is transmitted (with the next portion of Tag_Data) to transponders 150. Otherwise, if there is no additional Tag_Data for transmission, processing ends.

The present invention employs half-duplex Direct Sequence Spread Spectrum (DSSS) radio communication between each interrogator 190 (FIG. 1) and one or more transponders 150. This is performed by spreading the spectrum of radio signals transmitted from interrogator 190, using Manchester-encoded frequency-modulation of the transmission from interrogator 190 to transponders 150, and amplitude/phase shift keying of re-radiated signal transmission from transponders 150 to an interrogator 190. Batch reading of transponders 150 is provided through the use of a TDMA communications protocol. The TDMA protocol provides an interrogator message time slot and N transponder response time slots for a total of N+1 time slots per TDMA frame. In the preferred embodiment, N=16, so up to 16 transponders 190 can communicate with an interrogator 190 in response to a single interrogator 190 transmission.

Figure 10A:
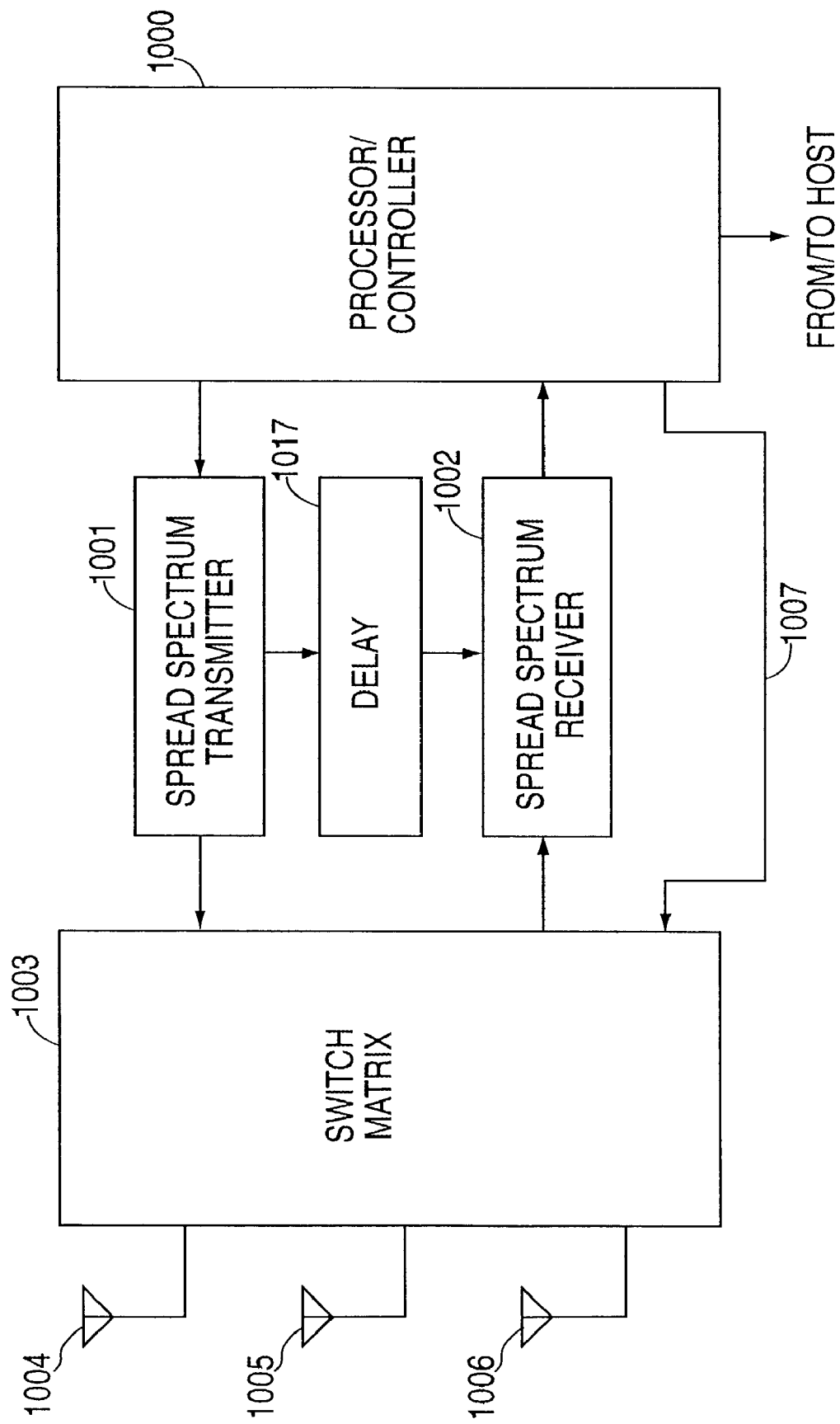
FIG. 10A is a high level block diagram of the interrogator system.

Referring now to the block diagram of FIG. 10A, in the preferred embodiment, an interrogator 190 includes a processor/controller 1000 connected to a spread spectrum transmitter 1001, a spread spectrum receiver 1002 and an antenna switch matrix 1003. A delay line 1017 is connected from transmitter 1001 to receiver 1002. In the preferred embodiment, three antennas 1004, 1005 and 1006 are connected to switch matrix 1003, in a manner discussed in further detail below, although, as will be clear to one of ordinary skill in the art, two antennas may be used in one alternative embodiment, and in some cases a single antenna will suffice. As discussed with respect to FIG. 1 above, processor/controller 1000 communicates with host computer 100 via a full-duplex communications channel. Interrogator 190 provides modulated signals to transmit messages to one or more transponders 150 (transmit mode), and also provides an illumination signal (receive mode) that is used by transponders 150 for use in reflecting a response message to interrogator 190 as backscatter modulated with amplitude/phase shift keying.

In particular, the modulation mode of transmitter 1001 is switched between FSK modulated spread spectrum when transmitting data to transponders 150, and BPSK modulated spread spectrum when receiving data from transponders 150. Interrogator 190 sends Manchester-encoded data on an FSK Direct Sequence Spread Spectrum (DSSS) signal and recovers differentially encoded Manchester data from transponders 150 when illuminating (i.e., transmitting) with a BPSK DSSS signal. The use of a DSSS illumination signal provides a range gating effect and provides a measure of multipath immunity. The use of differential encoding for the response from transponders 150 eliminates the need for complex decision circuitry in interrogator 190, since the phase range to individual transponders 150 could result in arbitrary data inversions. As understood by one of ordinary skill, differential encoding provides data polarity decisions based on a bit to bit phase comparison, wherein, for example, a data one is encoded as a change in phase between one bit and the next, while a data zero is encoded as no change.

In the system of the present invention, receiver 1002 is able to operate in the presence of transmissions by transmitter 1001, because even though the system operates in a half-duplex mode, the signals received by receiver 1002 are based upon the BSPK DSSS signals transmitted by transmitter 1001. The isolation between transmitter 1001 and receiver 1002, and the effective range for communication with a transponder 150 is governed by the physical separation between the transmit and receive antennas and the range gating provided through digital Direct Sequence modulation of the spreading code.

In operation, transmitter 1001 sends a replica of the signal fed to antennas 1004-1006 through delay line 1017 to receiver 1002, as a coherent local reference signal that is used to optimally demodulate a return signal having the same net delay, thus improving both transponder discrimination and reducing the effect of direct illumination of the receiver antenna by the transmitted signal.

Figure 10B:
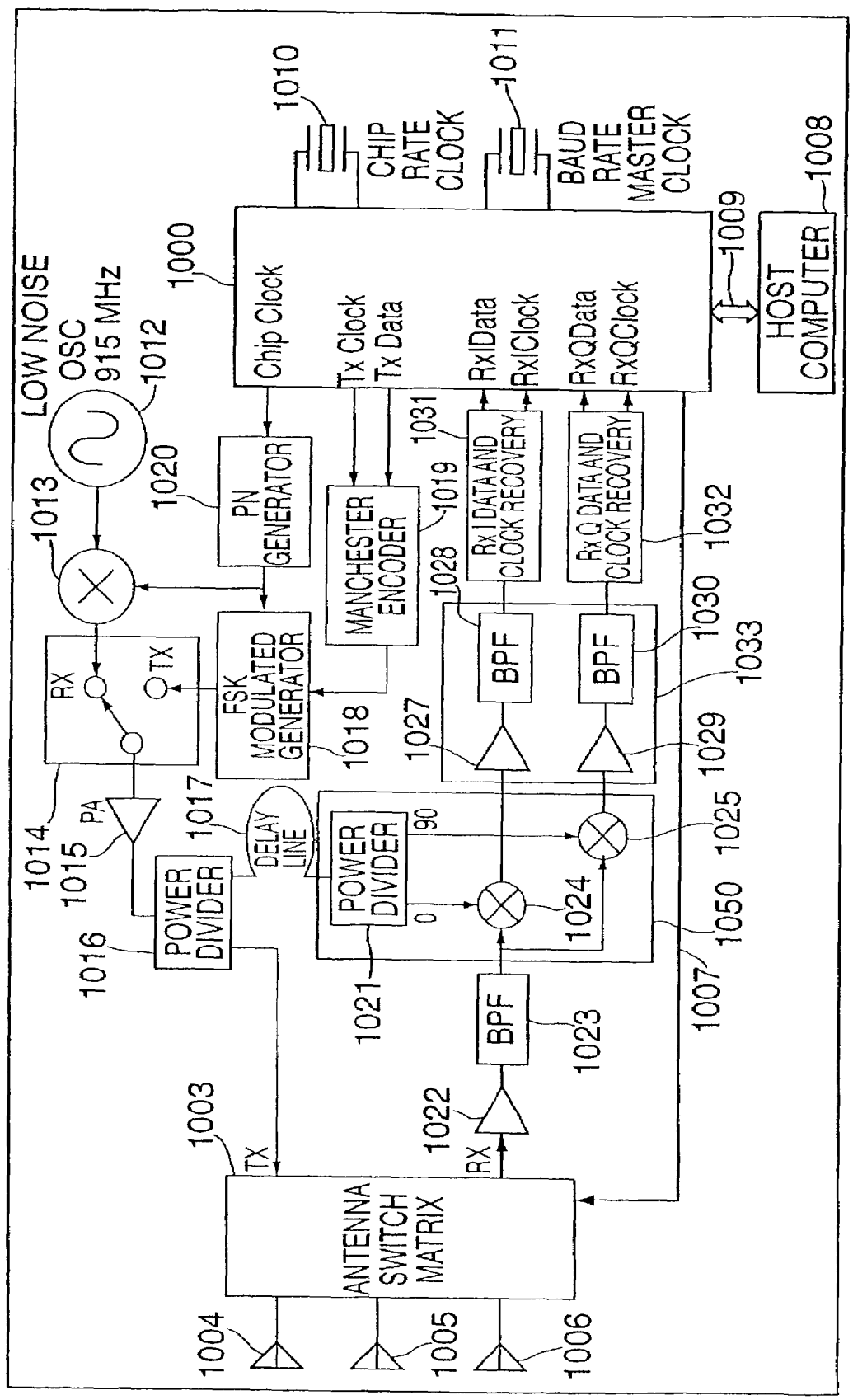
FIG. 10B is a detailed block diagram of the interrogator system.

Referring now to the functional block diagram of interrogator 190 illustrated in FIG. 10B, data for transmission from processor/controller 1000 is first Manchester encoded by encoder 1019, and then spread by a pseudo-random code generator 1020 in combination with FSK modulated generator 1018. The FSK modulated generator 1018 generates a DSSS signal which predominantly is in one half of the band (upper or lower) when the input from Manchester encoder 1019 is a logic one, and conversely occupies the other half of the band when the input is a logic zero. Since the data from Manchester encoder 1019 is balanced (occupies as much time as a logic one as a logic zero on a bit by bit basis), the resultant emission spectrum occupies the entire bandwidth when averaged over one or more bit times. Alternatively, the emission spectrum could be generated using a Frequency Hopped Spread Spectrum (FHSS) system which hops randomly in one half of the band (upper or lower) when the input from Manchester encoder 1019 is a logic one, and conversely which hops randomly in the other half of the band when the input is a logic zero.

In the Transmit mode, the output of the FSK modulated generator is directed via switch 1014 to the Transmit Power Amplifier 1015. The output of the Transmit Power Amplifier 1015 is routed, via the Power Divider 1016 to the Delay Line 1017 and to the Transmit port of Antenna Switch Matrix 1003. The Antenna Switch Matrix 1003, under command of processor/controller 1000 selects one of the preferably three antennas 1004-1006 to be used for transmission.

In the Receive mode, the DSSS illumination signal is generated in a balanced Modulator 1013 by convolving a stable, low phase noise carrier (915 MHz, in the preferred embodiment) generated by oscillator 1012 with the output of Pseudo Noise (PN) generator 1020. The resultant BPSK-DSSS signal is amplified by Power Amplifier 1015 and then transmitted by a selected one of interrogator antennas 1004-1006, under the control of antenna switch matrix 1003.

A signal received from a transponder 150 is routed from a selected one of three interrogator antennas 1004-1006 (different from the antenna chosen for transmission) to low noise amplifier 1022, filtered by band pass filter 1023, split into I and Q baseband components and by mixing with delayed quadrature phase components of the transmitted signal by circuit 1050, (comprised of quadrature power divider 1021, in-phase mixer 1024 and quadrature-phase mixer 1025). The signals out of the in-phase mixer 1024 and quad-phase mixer 1025 are deconvolved to baseband as an I/Q representation of the received signal. Each output contains a DC component representative of the static clutter in the field being illuminated, plus a smaller AC component representative of the modulated return from each transponder 150. Other AC components (which are undesired) are: low frequency noise, predominately from the transmitter; and high frequency noise from external interference sources along with residual code lines from the transmitted DSSS signal. Since Manchester coding is employed for the modulated return, it is amenable to bandpass filtering for separation of the baseband data from undesired noise. This is accomplished in the baseband processor section 1033 consisting predominately of I and Q amplifiers 1027 and 1029, respectively, and I and Q bandpass filters 1028 and 1030, respectively. The amplified and filtered I and Q outputs of baseband processor 1033 are routed to identical clock and data recovery circuits, circuits 1031 for the RxI signal and circuits 1032 for the RxQ signal. The clock and data recovery is accomplished in a fully digital implementation which first samples the baseband input at a rate N times the incoming data rate (N=8 in the present embodiment). These samples are routed for processing in two separate channels; data recovery and clock recovery. The data recovery channel performs a one bit integration to recover NRZ from the Manchester data, and then performs a modulo-2 addition of the current bit with the prior bit, to achieve the differential decoding, thus recovering the original unencoded NRZ data. In the clock recovery channel, data transitions are extracted from the incoming data stream, filtered and compared in phase to a digital discrete phase lock loop (DDPLL). Once locked, the DDPLL tracks the frequency and phase of the incoming data stream, and is thereafter used for the synchronous transfer of the recovered data into the processor 1000. Processor/controller 1000 processes both the RxI and RxQ data inputs looking for a valid Preamble, Break, and Synch message header. (See FIG. 3). The processor then determines which channel (i.e., RxI or RxQ) data it will use for the duration of the message. The decision is made simply based on which channel accepts the Synch portion of the message header first. This strategy exploits a characteristic of the DDPLL in which the DDPLL in the channel with the poorer signal to noise ratio (SNR) will lag the DDPLL in the channel with the higher SNR. The processor/controller 1000 then processes the Header and the remainder of the message using data from the selected channel. Preferably, a state machine handles the receive and transmit messaging as discussed with respect to FIGS. 2-9, above, although as one of ordinary skill in the art will readily recognize, alternatives such as a microprocessor may be substituted.

Referring again to FIG. 10A, in the preferred embodiment, interrogator 190 consists of a low noise RF signal source (preferably a SAW resonator oscillator), modulators and amplifiers and an application specific integrated circuit (ASIC) including a digital processor. The digital processor receives commands from processor/controller 1000, formats the appropriate outgoing message, generates the pseudonoise code, and creates a spread spectrum signal which is broadcast to the transponders 150. Receiver 1002 in interrogator 190 samples the transmitted signal, delays it in time by an amount equal to the round trip propagation time between interrogator 190 and a transponder 150, and utilizes this delayed signal as the receiver local oscillator. Signals reflected by the antennas and from nearby objects do not correlate as well as signals whose range is being matched by the receiver delay. In the preferred embodiment, the "optimum" range is 18 feet, and the correlation window is approximately 36 feet, null to null. In operation, ranges in excess of 30 feet have been observed. The output of receiver 1002 is fed back to processor/controller 1000, where data clock and data are extracted from the received signal.

The antennas 1004 and 1006 used in the preferred embodiment are planar arrays, which are constructed using an excited slot in a conducting sheet and which are linearly polarized. In operation, an array of antennas (two or more with differing polarization) must be utilized to provide unambiguous coverage of the possible transponder 150 antenna orientations that might be present during a read cycle. A third antenna 1005 having polarization complementing antennas 1004 and 1006 is included in the antenna array. Switching matrix 1003 permits selection of any one of the six possible transmit/receive combinations available from the three antennas 1004-1006, which selection is under the control of host computer 100. During the Read Tag_ID mode shown in the flowchart of FIGS. 5, 5A and 5B, these combinations are cycled to ensure all transponders 150 within range are accessed. When each Tag_ID is logged into the host computer 100, the antenna combination(s) associated with successful communication is (are) also logged. During any subsequent host command which addresses a specific transponder 150 by its Tag_ID, the logged antenna combination(s) is used first. If the communication fails, then other combinations are used. This procedure is used to minimize the read time.

Figure 11:
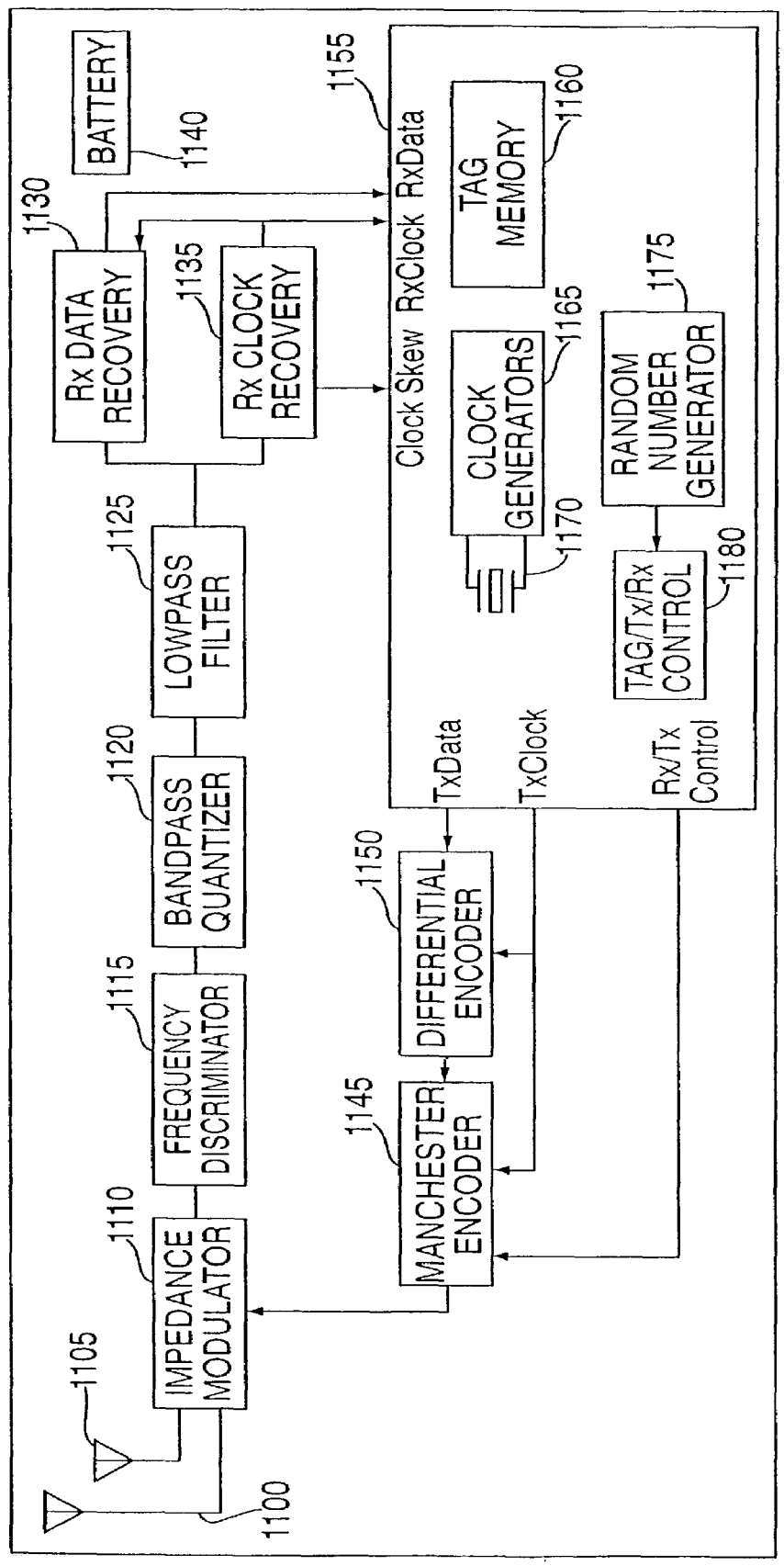
FIG. 11 is a block diagram of the transponder system.

Referring now to the block diagram of transponder 150 in FIG. 11, an antenna comprised of elements 1100 and 1105 receives RF transmission from an interrogator 190 and an RF switch acting as an impedance modulator 1110 at the antenna feed point is operated by controller 1155 via the Rx/Tx control line for either directing signals to the receiver portion of transponder 150 or modulating the re-radiation (reflection) of RF illumination from interrogator 190 back to interrogator 190. The modulation effect produced by the Impedance Modulator 1110 appears to an observer near transponder 150 as Amplitude Shift Keying (ASK). This is due to the fact that the switch alternately shorts the antenna terminals causing the antenna to be a reflector, or it passes the signal to a load (Frequency Discriminator 1115), which causes the antenna to be absorptive. The modulated signal received at the interrogator, however, is no longer simple ASK. The weak return signal is summed with a much larger unmodulated component with arbitrary phase. The vector sum composite, as received by the interrogator can be either pure AM, pure PM, or any combination in between, referred to elsewhere as "amplitude/phase shift keying". It is for this reason that interrogator 190 employs I and Q demodulation. Signals received by transponder 150 pass through impedance modulator 1110, with minimal attenuation, and through a passive frequency selective network, i.e., frequency discriminator 1115, that demodulates the frequency-modulated signal component of the received signal. Signal detection is provided by, in the preferred embodiment, a conventional Foster-Seeley discriminator, or as one of ordinary skill in the art will readily recognize, other frequency selective differential diode detection and voltage comparison circuits. The received signal passes though bandpass quantizer 1120 (a conventional comparator based data slicer) and an anti-aliasing lowpass filter 1125 (a conventional RC Low Pass Filter). The signal at the output of lowpass filter 1125 is a recovered amplitude limited analog baseband signal, which is split into two channels, a first channel in which the signal first digitally sampled in Rx data recovery circuit 1130, which provides data bandpass filtering and conditioning, conversion of the received Manchester data to NRZ, and reclocking of the recovered data (i.e., a digital baseband replica of the Interrogator transmitted NRZ Data (RxD)), and a second channel in which the signal is first digitally sampled in Rx clock recovery circuit 1135 to extract data transitions for filtering by a digital phase locked loop which creates a local replica of the transmit data clock in both phase and frequency (i.e., a digital baseband replica of the Interrogator transmitted Manchester encoded Clock (RxD CLK)) that is provided to state machine 1155 and to Rx data recovery circuit 1130. As one of ordinary skill in the art will readily recognize, the various functions performed by transponder 150 may be implemented in hardware, software, and/or firmware. The resulting demodulated NRZ data from Rx data recovery circuit 1130 is fed to state machine 1155 which processes and responds to the received signal as discussed with respect to FIGS. 2-9 above.

State machine 1155 consists of clock crystal 1170, clock generator 1165, tag memory 1160, random number generator 1175, and tag Rx/Tx control 1180. Clock generator 1165 consists of an oscillator stabilized by crystal 1170 and a cascade of frequency dividers. Crystal 1170, in the presently preferred embodiment, is a 32,678 Hz crystal of a type normally used in quartz wristwatches. The crystal frequency is used for sampling in the Rx data recovery 1130 and Rx clock recovery 1135, with eight times over sampling in the present embodiment, setting the Rx data rate at 4096 Hz. Clock generators 1165 are used to set the transmit data rate of transponder 190 (16,384 Hz in the present embodiment) and to provide clocks for other blocks within the state machine 1155. As one of normal skill in the art would readily recognize, the choice of these frequencies is not critical and that other choices of data rates and clock frequencies would also provide adequate performance. Further, one of ordinary skill in the art would understand that the control of the clock frequencies can be accomplished by other methods.

Random number generator 1175 is used by state machine 1155 for a variety of operations, as discussed with respect to FIGS. 2-9, above. It is important that the number generated be non-deterministic (i.e., truly random) to uphold the statistical validity of the ability of the present invention to process large numbers of transponders 150 in one field at one time. In order to achieve the required randomness while maintaining the desired economy in terms of current drain and gate count, the presently preferred embodiment combines a short pseudo random noise generator (PNG) (known alternatively in the literature as a shift register generator (SRG) or as a Linear Feedback Shift Register Generator (LFSR)) with a process controlled by thermal noise which generates randomly occurring pulses.

Figure 16:
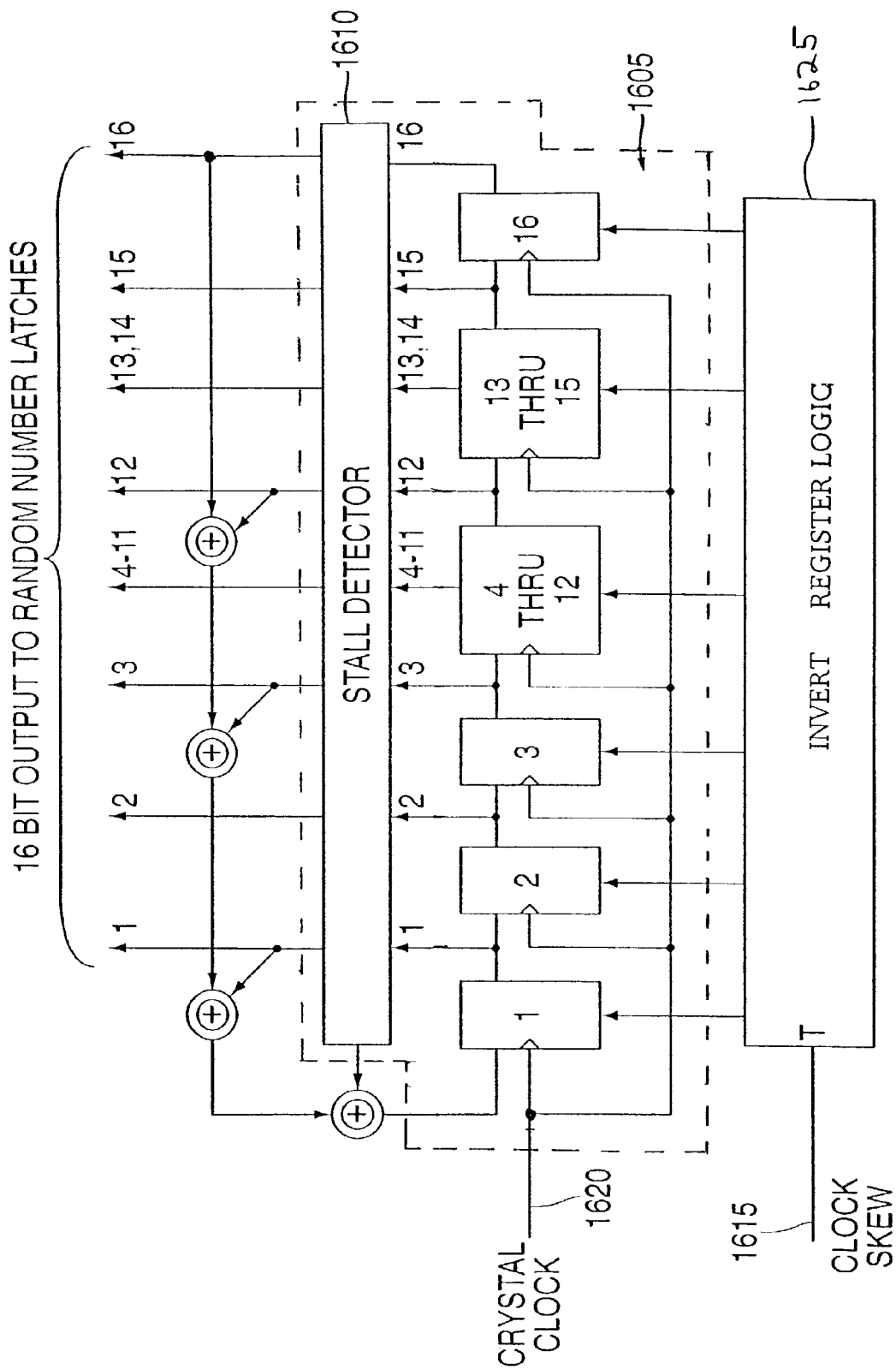
FIG. 16 is a block diagram of the random number generator used in the present invention.

Referring now to FIGS. 11 and 16, the present invention uses a conventional 16 bit SRG 1605 (shown within the dotted box in FIG. 16). A conventional stall detector 1610 is included within 16 bit SRG 1605 to exclude the "all zeroes" state. Taps are included at the outputs of stages 1, 3, 12 and 16 of SRG 1605 which are exclusive OR'd and fed back to the input of stage 1. In response to the aforementioned randomly occurring pulses, the state of 16 bit SRG 1605 is modified by applying the output(s) from a toggle flip-flop and select mask contained within invert register 1625. The input at 1615 is a random pulse source derived from clock skew information provided by Rx clock recovery circuit 1135. The SRG 1605 is clocked, in the preferred embodiment, by the highest frequency clock available from clock generator 1165. When no signal is being received by transponder 150, the clock skew pulses are as random as the noise provided by bandpass quantizer 1120. When a signal is being received, the skew pulses occur at a rate proportional to the frequency offset between the baud rate master clock 1011 (FIG. 10B) in interrogator 190 and crystal 1170 in transponder 150, which is a second random variable. Random number generator 1175 runs continuously and the contents of 16 bit SRG 1605 are latched into other registers when a random number is needed. When a random number larger than 16 bits is required, the output is latched twice in succession to provide the additional bits. As apparent to one of ordinary skill in the art, the number of stages in 16 bit SRG 1605 could be greater than or less than 16. For each length there are tables available which provide choices of feedback tap locations which guarantee the sequence produced by the generator will be maximal.

Tag Rx/Tx control 1180 implements the state machine steps and processes for proper transponder operation, as discussed with respect to FIGS. 2-9 above. Tag memory 1160 holds the transponder data which is written into transponder 150 with the Write Tag_Data command or the Replace Tag Data command as described with respect to FIGS. 3 and 9 above. In addition, tag memory 1160 is accessed whenever a Read Tag Data command is accepted by transponder 150 as described with respect to FIGS. 3 and 8 above.

Finally, a battery 1140 is provided within transponder 150 shown in FIG. 11 as a power source therefor. In the present embodiment, the battery is preferably a coin cell of the 3 Volt Lithium type. In an alternative embodiment, by using a fully custom IC, it is possible to eliminate the battery altogether and power the transponder from detected RF signal voltage, since interrogator 150 is transmitting continuously with a constant envelope signal during the entire cycle of issuing commands to transponders 150 and then providing an illumination signal for receiving reflected signals from transponders 150.

Figure 12:
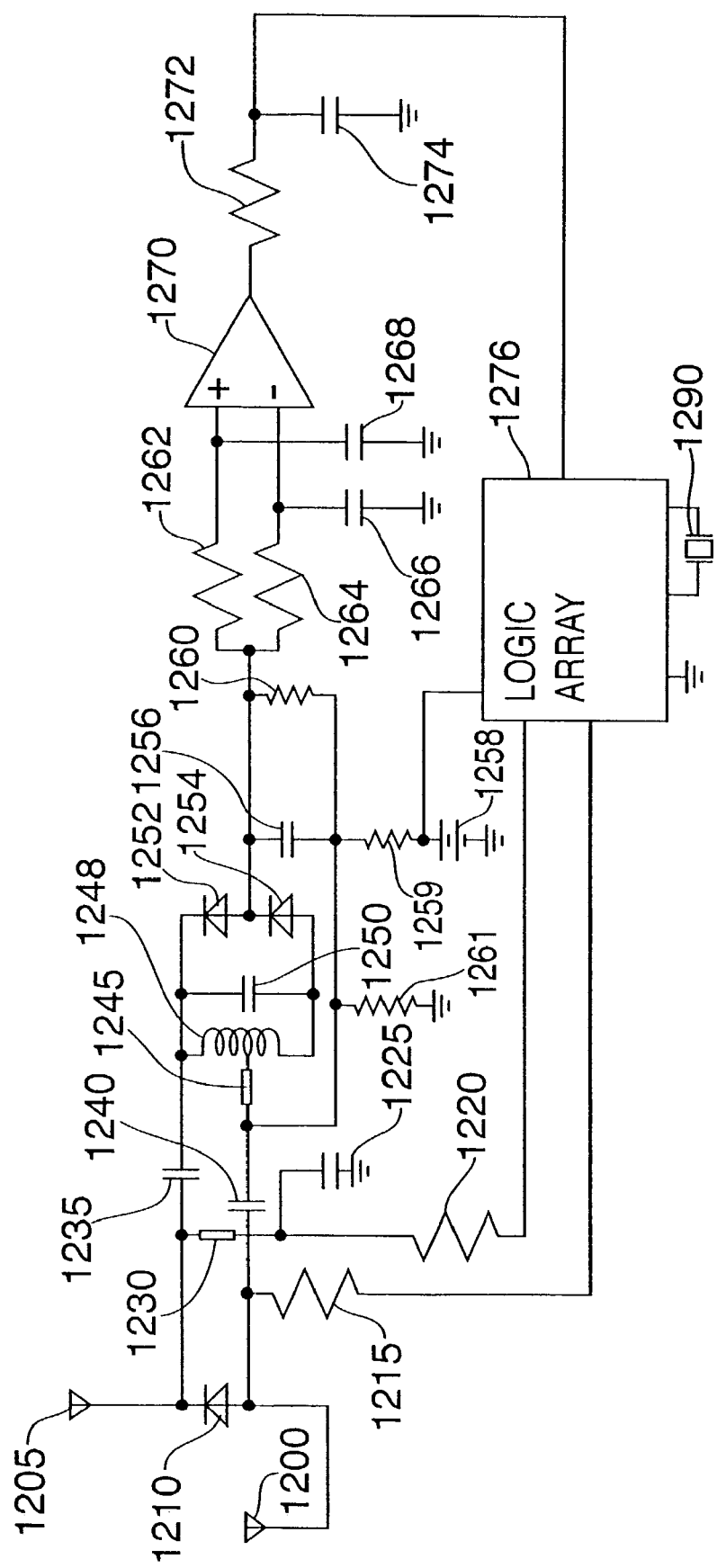
FIG. 12 is a partial schematic diagram of the transponder system.

Referring now to the simplified schematic of transponder 150 in FIG. 12, antenna elements 1200 and 1205 (which correspond to antenna elements 1100 and 1105 in FIG. 11 and which are described in detail with respect to FIG. 13 below) receive signals from and modulate reflected signals to a corresponding interrogator 190. Diode 1210 is a PIN diode in the presently preferred embodiment that is connected between antenna elements 1200 and 1205 as shown in FIG. 12 with the anode of diode 1210 connected to antenna element 1200 and the cathode of diode 1210 connected to antenna element 1205. Diode 1210 acts as an impedance modulator (i.e., a transmit/receive switch) under the control of logic array 1276 via resistor 1215, resistor 1220 and inductive element 1230. Resistor 1215 is connected between the anode of diode 1210 and logic array 1276 and the series combination of resistor 1220 and inductive element 1230 is connected between the cathode of diode 1210 and logic array 1276. Logic array 1276 sets the bias on diode 1220 though the loop formed by resistor 1220, inductive element 1230, diode 1210 and resistor 1215. Resistors 1215 and 1220 also provide isolation to logic array 1276 from RF signals present at the terminals of diode 1210. Bypass capacitor 1225 connected between the junction of resistor 1220 and inductive element 1230 and ground and provides further isolation from RF signals to logic array 1276. inductive element 1230 provides a low inductance connection from bypass capacitor 1225 to antenna element 1205.

Frequency discriminator 1115 of FIG. 11 is preferably of Foster-Seeley design, and in the preferred embodiment consists of capacitor 1235, capacitor 1240, capacitor 1250, capacitor 1256, inductive element 1245, center tapped inductor 1248, detector diode 1252 and detector diode 1254. As understood by one of ordinary skill in the art, center tapped inductor 1248 has a first end, a second end and a center tap. Capacitor 1235 is connected between the cathode of diode 1210 and the first end of inductor 1248. Capacitor 1240 is connected between the anode of diode 1210, a first end of inductive element 1245 and a DC bias point provided by the series combination of resistors 1259 and 1261 which series pair is connected between battery (power supply) 1258 and ground. The second end of inductive element 1245 is connected to the center tap of inductor 1248. Capacitors 1235 and 1240 provide impedance matching and DC blocking between the discriminator and the antenna formed by elements 1200 and 1205. Capacitor 1250 is connected between each end of inductor 1248 and resonates with inductor 1248 to set the center frequency of the frequency discriminator. The series combination of diode 1252 and diode 1254 are also connected between each end of inductor 1248, with the cathode of diode 1252 connected to the first end of inductor 1248, the anode of diode 1252 connected to the cathode of diode 1254 and the cathode of diode 1254 connected to the second end of inductor 1248. The point which connects the anode of diode 1252 and the cathode of diode 1254 serves as the output of the discriminator. Capacitor 1256 is connected between the output of the discriminator and the DC bias point generated by resistors 1259 and 1261, and provides a short to RF frequencies present at the output while allowing the data demodulated by the discriminator to pass through to the next stage. Resistor 1260 provides a DC return for the discriminator's center frequency reference voltage (i.e., the DC bias voltage).

Bandpass quantizer 1120 of FIG. 11 is implemented in FIG. 12 by the combination of a first conventional RC low pass filter formed by resistor 1262 and capacitor 1268 which has a cutoff frequency selected to pass the received data but attenuates higher frequency noise outside the data bandwidth, a second conventional RC low pass filter formed by resistor 1264 and capacitor 1266 which has a cutoff frequency selected to pass only the DC component of the demodulated data, and a comparator which receives as a first input the output of the first low pass filter and as a second input the output of the second low pass filter. In operation, the combination of the two low pass filters and comparator 1270 operate as a bandpass one bit quantizer.

Lowpass filter 1125 of FIG. 11 is preferably a conventional RC low pass filter and in FIG. 12 consists of the combination of resistor 1272 and capacitor 1274. This low pass filter provides a final anti-alias low pass filtering of the received signal prior to being provided to logic array 1276.

The remaining functions shown in FIG. 11, including Rx data recovery 1130, Rx clock recovery 1135, Manchester encoder 1145, differential encoder 1150 and state machine 1155 are performed by digital circuitry within logic array 1276 of FIG. 12. In addition, crystal 1290 is used to drive a crystal oscillator which has an output that is used for timing within logic array 1276. Finally, in the presently preferred embodiment, battery 1258 acts as the power supply for the active components, including comparator 1270 and logic array 1276.

As one of ordinary skill in the art would readily recognize, in an alternative embodiment all of the circuitry shown in FIG. 12 could be integrated into a single monolithic integrated circuit, with the exception of battery (if as discussed above, it is needed at all), the antenna and crystal 1290.

Figure 13:
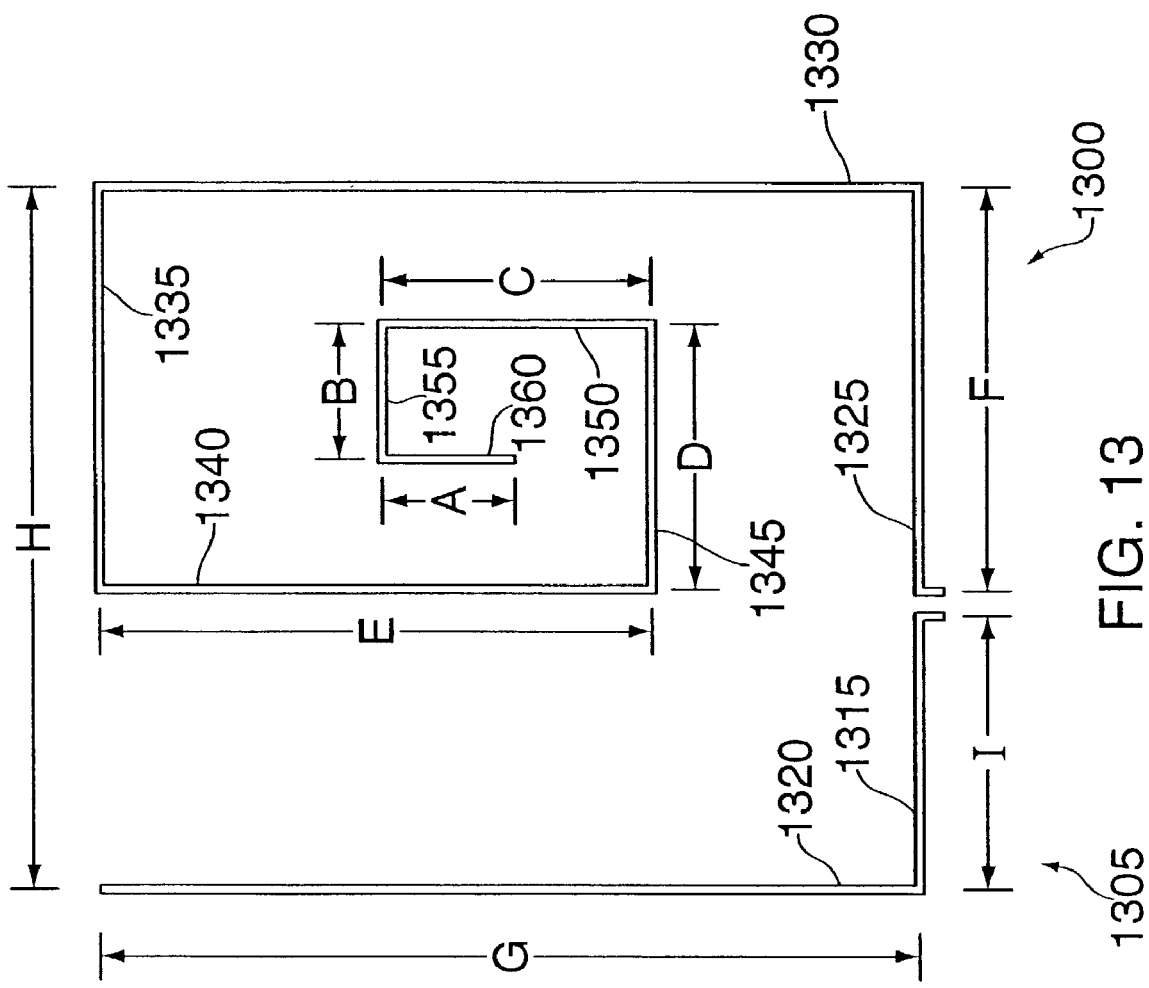
FIG. 13 is diagram showing the physical layout of the transponder antenna.

Referring now to FIG. 13, the antenna for transponder 150 is required to possess a wide bandwidth, be nominally omnidirectional and be physically small. In addition, the antenna is required to function efficiently as a receive antenna, while also providing a suitable controllable reflector in the "transmit" mode. In the present invention, an antenna structure meeting these requirements consists of an array of two resonant antennas elements (element 1300 and element 1305 corresponding to antenna element 1100 and antenna element 1105, respectively, in FIG. 11 and to antenna element 1200 and antenna element 1205, respectively, in FIG. 12), one which is ¼λ (one quarter wavelength) (element 1305), and one which is ¾λ long (element 1300). When electrically joined, the result is a resonant line 1λ (one wave length) long, which efficiently reflects incident RF energy. When isolated with a suitable load impedance, the structure acts as an offset fed dipole antenna, also resonant, but which now delivers energy to a load. This latter mode is used in receive mode and also as one of the two states (absorptive, as opposed to reflective) in transmit mode.

The antenna is preferably mounted on a small card, with dimensions substantially the same as a conventional credit card. The length of the full size antenna (i.e., the straight length) is nearly 12 inches (i.e., at a full wavelength at 915 MHZ) is too long for this type of card, necessitating a folding configuration for the antenna. The antenna folding is done in a manner that does not narrow the bandwidth. A conventional method to achieve this is to use antenna shapes which have a resonant behavior based on angles rather than length. The antenna of the present invention utilizes a geometric spiral to reduce the size of the ¾λ element. In the present embodiment, element 1320 and element 1315 combine for the ¼λ (one quarter wavelength) portion 1305 of the antenna. The ¾λ (three quarter wavelength) spiral portion 1300 is comprised of elements 1325, 1330, 1335, 1340, 1345, 1350, 1355, and 1360. With respect to the lengths shown in FIG. 13, the defining relationships between these lengths are as follows:

$B=A$
$C=2A$
$D=2A$
$E=4A$
$F=3A$
$G=6A$
$H=5A$
$I=2A$

As known to those of ordinary skill in the art, some minor adjustments may be needed to account for bordering (edge) discontinuities, effective dielectric constants, fringing effects, etc. In particular, the ¼λ element 1305 in the presently preferred embodiment employs a short segment of increased linewidth (not shown) at the end of element G to achieve optimal tuning.

Figure 14:
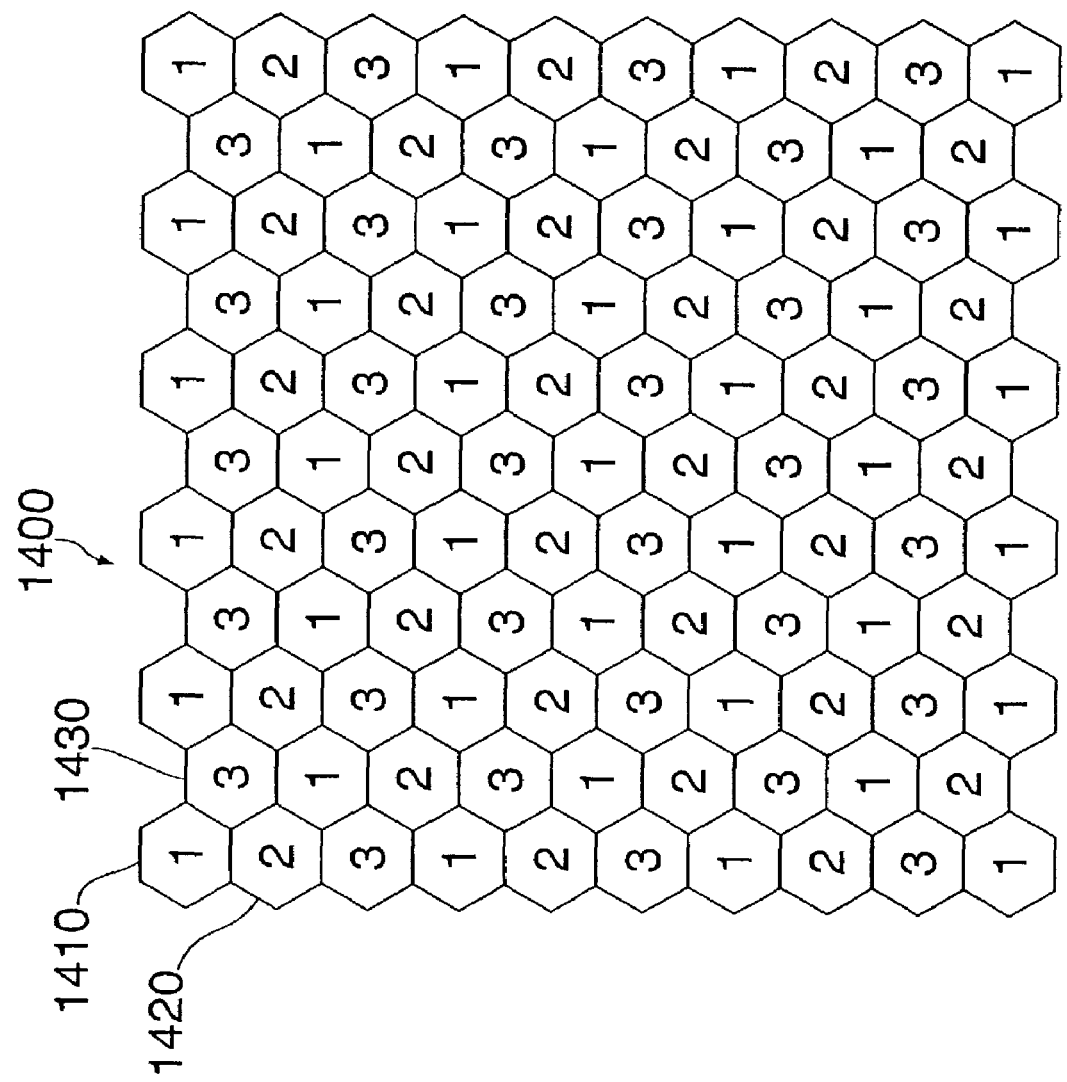
FIG. 14 is a block diagram showing a first embodiment of an interrogator array configuration.
Figure 15:
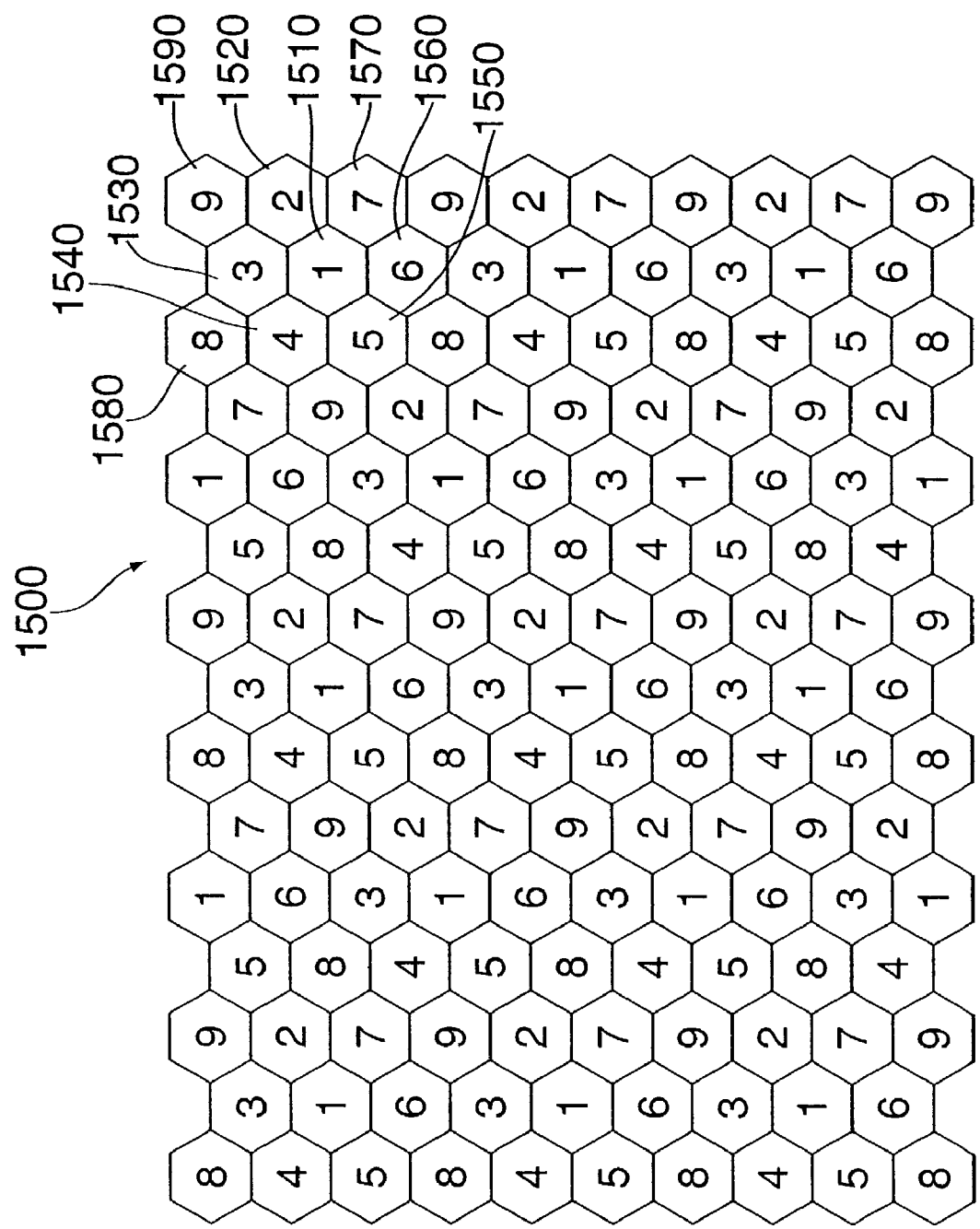
FIG. 15 is a block diagram showing a second embodiment of an interrogator array configuration.

Referring now to FIGS. 14 and 15, in an additional aspect of the present invention, when the area in which the tagged articles are to be located is much larger than the spatial range of a single interrogator, a plurality of interrogators 190 are installed in a hexagonal pattern 1400 within such area, all linked to host computer 100 (the interconnection between the host computer 100 and a plurality of interrogators 190 is shown in FIG. 1). In FIGS. 14 and 15, each hexagonal area represents a separate interrogator 190 and the plurality of interrogators are divided into groups. In a first alternative of this aspect of the present invention, specifically shown in FIG. 14, interrogators 190 are assigned to one of three groups (marked as 1, 2 or 3 in FIG. 14), arranged in next-nearest neighbor format. In operation, only one group of the three groups of interrogators is active at a time, e.g., only the interrogators in group 1 (e.g., interrogator 1410) transmit at the same time. Interrogators in groups 2 and 3 are inactive while the group 1 interrogators are active. After the group 1 interrogators have completed their operations, the interrogators in group 2 become active (e.g., interrogator 1420), while the group 1 and 3 interrogators become inactive. Finally, the interrogators in group 3 become active (e.g., interrogator 1430), while the group 1 and 2 interrogators become inactive. In this manner, it is possible to greatly reduce the amount of time required to read all tagged articles over the prior art method, which requires that only a single interrogator be active at a time.

If the area in which the tagged articles are located is very large, the total radio-frequency (RF) power generated by the many interrogators 190 operating simultaneously may produce too much RF interference in other nearby RF systems operating in the same radio band. Furthermore, the combined RF background interference that is picked up by some of interrogators 190 may result in diminished performance of those interrogators 190. In such cases, in a second alternative of this additional aspect of the present invention shown in FIG. 15, the number of interrogators 190 transmitting simultaneously may be decreased substantially by grouping interrogators 190 on the basis of higher orders of nearest neighbors. For example, if interrogators 190 are grouped on a second order basis, as shown in array 1500 in FIG. 15, then the ratio of active to inactive interrogators is 1:9. In FIG. 15, when the group 1 interrogators 190 are active (e.g., interrogator 1510), the remaining groups 2-9 interrogators (e.g., interrogators 1520-1590) are inactive. As above, each group sequentially becomes active, with the remaining groups inactive, until all nine groups have completed their operation.

In the event that a further reduction in the radiated RF interference is required, as one of ordinary skill in the art will readily recognize, higher order nearest neighbor groupings can be established, e.g., for third-order nearest neighbors, only 1 in 27 interrogators will be active simultaneously, but with a consequent increase in the time required to communicate with the tagged articles.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. An RFID system comprising:
   a plurality of RFID transponders configured to receive a signal and to generate a response signal based thereon, said RFID transponders having a random number generator usable to determine whether to respond to a received message addressed to said plurality of RFID transponders, said RFID transponders being further configured to use said random number generator to generate a unique identification code based only on a first random number generated by said random number generator, each said unique identification code being associated with a respective RFID transponder;
   a host computer configured to generate a message for transmission to at least one of said RFID transponders; and
   at least one interrogator communicatively coupled to said host computer having an interrogator transmitter and an interrogator receiver which operate in half-duplex mode, wherein said interrogator transmitter is capable to transmit messages received from said host computer to said plurality of RFID transponders during a first part of said half-duplex mode and provide an illumination signal to said plurality of RFID transponders during a second part of said half-duplex mode, and said interrogator receiver is capable to receive a signal generated by said at least one of said RFID transponders and provide said received signal to said host computer;
   wherein said host computer is configured to identify the unique identification code associated with each of said plurality of RFID transponders by iteratively transmitting a message including a variable having a predetermined value to said RFID transponders, and only said RFID transponders which generate a second random number greater than said variable respond to said message by transmitting the identification codes associated with said respective RFID transponders.

2. The RFID system of claim 1, wherein said signals are transmitted in spread spectrum format.

3. The RFID system of claim 1, wherein communications between said at least one interrogator and said plurality of RFID transponders is in TDMA format in which a number of time slots are available for transmission.

4. The RFID system of claim 3, wherein said RFID transponders which generate a second random number greater than said variable are also configured to use said generated random number to determine which time slot to use for transmission of said response signal.

5. The RFID system of claim 1, wherein said host computer is configured to intelligently adjust said variable after receipt of a response signal to ensure that an adequate number of responses are received during a next iteration.

6. A method for generating identification codes for a plurality of RFID transponders, comprising:
   transmitting a re-select identification code command to a plurality of RFID transponders;
   in response to receiving the re-select identification code command, generating, at said plurality of RFID transponders, a first random number and calculating a new identification code based only upon said first random number;
   iteratively transmitting a read identification code command and a variable having a predetermined value from a host to said plurality of RFID transponders;
   receiving, at said plurality of RFID transponders, said read identification code command and said variable;
   generating, at said plurality of RFID transponders, a second random number;
   comparing, at said plurality of RFID transponders, said variable with said generated second random number;
   transmitting, by said RFID transponders where said generated second random number is greater than said variable, the new identification code associated with said RFID transponder and then becoming inactive such that said RFID transponder does not respond to further read identification code commands during a current read identification code process;
   waiting, by said RFID transponders where said generated second random number is not greater than said variable, for a next transmission of said read identification code command and said variable;
   intelligently adjusting, by said host, the value of said variable for the next transmission of said read identification code command and said variable; and
   examining said variable at said host and ceasing the iterative transmission of said read identification code command when no RFID transponders respond by transmitting their new identification code in response to a final value of said variable.

7. The method of claim 6, wherein said predetermined value for said variable is set as a high value, said intelligently adjusting the value of said variable reduces the value of said variable, and wherein said final value is zero.

8. An interrogator for communicating with an RFID transponder in an RFID system, comprising:
   at least one antenna;
   a transmitter coupled to said at least one antenna and configured to transmit an FSK modulated spread spectrum signal on said at least one antenna during a transmitting mode and a BPSK modulated spread spectrum signal during a receiving mode;
   a receiver coupled to said at least one antenna and configured to receive a spread spectrum signal in PSK format; and
   a controller coupled to said transmitter and said receiver and configured to control said transmitter and said receiver.

9. The interrogator of claim 8, wherein said at least one antenna comprises a first antenna having a first polarization and a second antenna having a second polarization which is orthogonal to said first polarization, and further comprising an antenna switch matrix configured to select one of said first antenna and second antenna for coupling to said transmitter and a second of said first antenna and said second antenna for coupling to said receiver.

10. The interrogator of claim 9, wherein said at least one antenna further comprises a third antenna having a third polarization which is orthogonal to said first polarization and to said second polarization, and said antenna switch is configured to select one of said first antenna, second antenna and third antenna for coupling to said transmitter and a second of said first antenna, second antenna and third antenna for coupling to said receiver.

11. The interrogator of claim 8, wherein said transmitter comprises:
   an FSK transmitter section configured to generate a message for transmission as a spread spectrum output signal in FSK format;
   a BPSK transmitter section configured to generate an illumination signal for transmission as a spread spectrum signal in BPSK format;
   an output amplifier; and
   a switch configured to selectively couple said FSK transmitter section or said BPSK transmitter section to said output amplifier.

12. The interrogator of claim 11, wherein said FSK transmitter section comprises:
   a Manchester encoder coupled to said controller;
   a PN generator coupled to said controller; and
   an FSK modulation generator coupled to said Manchester encoder and said PN generator.

13. The interrogator of claim 11, wherein said BPSK transmitter section comprises:
   a PN generator;
   a low noise oscillator; and
   a balanced modulator coupled to said PN generator and said low noise oscillator.

14. The interrogator of claim 8, wherein said receiver comprises:
   a band pass filter having an input coupled to said at least one antenna for receiving a signal;
   a first mixer and a second mixer each having a first input coupled in parallel to an output of said band pass filter and a second input coupled to a signal derived from a transmitted signal;
   a first bandpass filter coupled to an output of said first mixer;
   a first data and clock recovery circuit coupled to an output of said first bandpass filter for recovering an in-phase version of said received signal;
   a second bandpass filter coupled to an output of said second mixer; and
   a second data and clock recovery circuit connected to an output of said second bandpass filter for recovering a quadrature-phase version of said received signal.

15. A transponder for communicating with an interrogator in an RFID system, comprising:
   a random number generator operable to generate a random number from which a unique ID for the transponder is generated;
   a first antenna element having a first predetermined dimensional configuration;
   a second antenna element having a second predetermined dimensional configuration;
   an impedance modulator coupled between said first antenna element and said second antenna element which causes said first antenna element to be electrically coupled to said second antenna element in a first state and to be electrically isolated from said second antenna element in a second state;
   a receiver configured to receive a message using said unique ID within an FSK modulated spread spectrum signal, said receiver being coupled to said first antenna element, said second antenna element and said impedance modulator; and
   a controller coupled to said receiver, said controller being configured to receive said message and selectively respond to said message using said unique ID in PSK format by reflecting an illumination signal transmitted by said interrogator by selectively switching said impedance modulator between said first state and said second state.

16. The transponder of claim 15, wherein said receiver comprises:
   a frequency discriminator having an input coupled to said first and second antenna elements;
   a bandpass quantizer having an input connected to an output of said frequency discriminator; and
   a low pass filter connected to an output of said bandpass quantizer.

17. The transponder of claim 15, wherein said first predetermined dimensional configuration is a length of one-quarter wavelength and said second predetermined dimensional configuration is a length of three-quarter wavelength.

18. The transponder of claim 17, wherein said first antenna element is comprised of two first sub-elements coupled at a ninety degree angle.

19. The transponder of claim 18, wherein said first sub-elements have a predetermined length relationship to each other.

20. The transponder of claim 17, wherein said second antenna element is comprised of a plurality of second sub-elements coupled at ninety degree angles in a geometrically folding configuration.

21. The transponder of claim 20, wherein said second sub-elements have a predetermined length relationship to each other.

22. The transponder of claim 15, wherein said first antenna element and said second antenna element together form a dipole configuration.

23. A method for a host having a plurality of transmitting antennas to read an identification code from a plurality of RFID transponders, each of said RFID transponders having a unique identification code that is generated based only on a first random number generated by a respective RFID transponder, said method comprising:
   iteratively transmitting a read identification code command and a variable having a predetermined value from said host to said plurality of RFID transponders on each of said plurality of transmitting antennas;
   receiving, at said plurality of RFID transponders, said read identification code command and said variable;
   generating, at said plurality of RFID transponders, a second random number;
   comparing, at said plurality of RFID transponders, said variable with said generated second random number;
   transmitting, by said RFID transponders where said generated second random number is greater than said variable, an identification code associated with said RFID transponder and then becoming inactive such that said RFID transponder does not respond to further read identification code commands during a current read identification code process;

waiting, by said RFID transponders where said generated second random number is not greater than said variable, for a next transmission of said read identification code command and said variable;

receiving at said host said transmitted identification codes associated with particular RFID transponders and storing said identification codes and associated antenna information in memory so that further communication with a particular one of said plurality of transponders is performed by using said identification code and said antenna information;

intelligently adjusting, by said host, the value of said variable for the next transmission of said read identification code command and said variable; and examining said variable at said host and ceasing the iterative transmission of said read identification code command when no RFID transponders respond by transmitting their identification code in response to a final value of said variable.

24. An RFID system for tracking election ballots comprising:

a plurality of RFID transponders connected to separate ballots, and configured to receive a signal and to generate a response signal based thereon, said RFID transponders having a memory configured to store election data and a random number generator usable to determine whether to respond to a received message addressed to said plurality of RFID transponders, said RFID transponders being further configured to use said random number generator to generate a unique identification code based only on a first random number generated by said random number generator, each said unique identification code being associated with a respective RFID transponder;

a host computer configured to generate a message for transmission to at least one of said RFID transponders and control the storage of election data within the memory of said RFID transponders connected to said ballots; and at least one interrogator communicatively coupled to said host computer having an interrogator transmitter and an interrogator receiver which operate in half-duplex mode, wherein said interrogator transmitter is capable to transmit messages received from said host computer to said plurality of RFID transponders during a first part of said half-duplex mode and provide an illumination signal to said plurality of RFID transponders during a second part of said half-duplex mode and said interrogator receiver is capable to receive a signal generated by said at least one of said RFID transponders and provide said received signal to said host computer;

wherein said host computer is configured to identify the unique identification code associated with each of said plurality of RFID transponders by iteratively transmitting a message including a variable having a predetermined value to said RFID transponders, and only said RFID transponders which generate a second random number greater than said variable respond to said message by transmitting the identification codes associated with said respective RFID transponders.

25. The RFID system of claim 24, wherein said host computer selectively transmits a predetermined message which causes each RFID transponder receiving said predetermined message to transmit its identification code to said host computer.

26. The RFID system of claim 25, wherein said host computer is configured to continuously transmit said predetermined message and receipt of said identification code by said host signals an alarm event.

27. In a communications system having a first device having a transmitter and a receiver and a plurality of second devices having a transmitter and a receiver, where communications between said first device and said plurality of second devices is in TDMA format having a plurality of time slots for transmission, a method for determining if more than one second device has transmitted a signal to said first device at the same time during a current TDMA communications period, comprising:

sampling the relative power in an analog baseband channel of said receiver in said first device during each of said time slots;

sampling the relative power in an analog baseband channel of said receiver in said first device during a period of no communications;

comparing said sampled relative power in each of said time slots to said sampled relative power in said period of no communications;

setting, if said comparison for a particular one of said time slots produces a value of greater than unity by a predetermined amount, said particular time slot to be occupied;

determining which of said time slots did not have an accepted message;

comparing said time slots which did not have an accepted message to said occupied time slots; and determining that each of said time slots which did not have an accepted message and which is occupied represents a time slot in which more than one second device transmitted a message at the same time.

28. The interrogator of claim 14, wherein said first data and clock recovery circuit comprises a first digital discrete phase lock loop circuit configured to synchronize to first signals input to said first data and clock recovery circuit, said second data and clock recovery circuit comprises a second digital discrete phase lock loop circuit configured to synchronize to second signals input to said second data and clock recovery circuit, and said controller is configured to choose between said in-phase version of said received signal and said quadrature-phase version of said received signal based upon which of said first and second digital discrete phase lock loop circuit first synchronizes to said first and second input signals, respectively.

29. A method for an RFID transponder to identify itself in a plurality of RFID transponders, comprising:

in response to receiving a re-select identification code command, generating a first random number and calculating an identification code for said RFID transponder based only upon said first random number;

receiving an initial read identification code command and a variable having an initial value;

generating a second random number and comparing the value of said variable with said second random number;

based on a comparison of the value of said variable with said second random number, transmitting said identification code of said RFID transponder and then becoming inactive such that said RFID transponder does not respond to further read identification code commands during a current read identification code process, otherwise waiting for a next transmission of said read identification code command and said variable;

iteratively receiving another read identification code command and said variable having another value that has been adjusted from a previous value; and based on a comparison of the adjusted value of said variable with said second random number, transmitting said identification code of said RFID transponder and then becoming inactive such that said RFID transponder does not respond to further read identification code commands during the current read identification code process, until no other RFID transponders respond to said read identification code commands by transmitting their identification code in response to receiving said variable having a final value.

30. The method of claim 29, wherein the initial value for said variable is set as a high value, said the value of said variable is adjusted to reduce the value of said variable, and wherein said final value is zero.

31. An RFID transponder, comprising:
a receiver configured to receive a wireless transmission of a command;
a random number generator configured to generate a first random number in response to receiving a re-select identification code command at said receiver;
a controller configured to generate an identification code for said RFID transponder based only upon said first random number; and
a transmitter configured to transmit the identification code of said RFID transponder,
wherein said random number generator is further configured to generate a second random number in response to said receiver receiving a read identification code command and a variable having an initial value; and
wherein said controller is further configured to compare the value of said variable with said second random number and, based on the comparison, to cause the transmitter to transmit said identification code of said RFID transponder, after which the controller is configured to become inactive such that said RFID transponder does not respond to further read identification code commands received by said receiver during a current read identification code process.

32. The RFID transponder of claim 31,
wherein, based on the comparison of said second random number with the value of said variable, the controller is further configured to wait for a next transmission of said read identification code command and said variable,
wherein said receiver is configured to receive another read identification code command and said variable having another value that has been adjusted from a previous value, and,
wherein said controller is configured to cause said transmitter to transmit said identification code of said RFID transponder based on a comparison of the adjusted value of said variable with said second random number, after which said controller is configured to become inactive such that said RFID transponder does not respond to further read identification code commands during the current read identification code process,
until no other RFID transponders respond to said read identification code commands by transmitting their identification code in response to receiving said variable having a final value.

33. The RFID transponder of claim 32, wherein the initial value for said variable is set as a high value, said the value of said variable is adjusted to reduce the value of said variable, and wherein said final value is zero.

34. An RFID system comprising:
a plurality of RFID transponders configured to receive a signal and to generate a response signal based thereon, each said RFID transponder having a random number generator operable to generate a first random number when said RFID transponder receives a re-select identification code command, wherein each said RFID transponder further includes a controller configured to generate a unique identification code for said RFID transponder based on said first random number, and wherein said unique identification code is associated with said RFID transponder without depending on a predetermined identifier of the respective RFID transponder, and wherein said random number generator is further configured to generate a second random number when said respective RFID transponder receives both a read identification code command and a variable having a value, said controller being further configured to compare the value of said variable with said second random number and, based on the comparison, cause a transmitter to transmit said unique identification code of said RFID transponder, after which said controller is configured to become inactive such that said RFID transponder does not respond to further read identification code commands received by said receiver during a current read identification code process.

35. The RFID system of claim 34, wherein said RFID transponders that generate a second random number greater than the value of said variable are also configured to use said second random number to determine a time slot to use for transmission of said unique identification code.

* * * * *

UNITED STATES PATENT AND TRADEMARK OFFICE
CERTIFICATE OF CORRECTION

PATENT NO. : 7,253,717 B2
APPLICATION NO. : 09/726136
DATED : August 7, 2007
INVENTOR(S) : J. T. Armstrong et al.

It is certified that error appears in the above-identified patent and that said Letters Patent is hereby corrected as shown below:

| COLUMN | LINE | ERROR |
|---|---|---|
| 3 | 59 | "other on channel carriers" should read --other on-channel carriers-- |
| 7 | 29 | "an quadrature" should read --a quadrature-- |
| 8 | 14 | "a random seed first is calculated" should read --a random seed is first calculated-- |
| 8 | 32 | after "zone" delete "of" |
| 8 | 57 | "at least one RFID transponders" should read --plurality of RFID transponders-- |
| 13 | 37 | "Op_Cost" should read --Opp_Cost-- |
| 18 | 47 | "If the all" should read --If all-- |
| 20 | 38-40 | "components and by mixing with delayed quadrature phase components of the transmitted signal by circuit 1050, (comprised of" should read --components, and mixed with delayed quadrature phase components of the transmitted signal by circuit 1050, (comprised of-- |
| 24 | 34 | after "capacitor 1225" insert --is-- |
| 24 | 37 | "inductive" should read --Inductive-- |
| 25 | 39 | after "exception of" insert --the-- |
| 25 | 48 | "antennas" should read --antenna-- |
| 25 | 65 | "length) is nearly" should read --length), nearly-- |
| 26 | 61 | before "interrogators 190" insert --the-- |
| 33 (Claim 30, | 13 line 2) | "said the value of said variable" should read --the value of said variable-- |

UNITED STATES PATENT AND TRADEMARK OFFICE
CERTIFICATE OF CORRECTION

PATENT NO. : 7,253,717 B2
APPLICATION NO. : 09/726136
DATED : August 7, 2007
INVENTOR(S) : J. T. Armstrong et al.

It is certified that error appears in the above-identified patent and that said Letters Patent is hereby corrected as shown below:

| COLUMN | LINE | ERROR |
|---|---|---|
| 34 (Claim 33, | 13 line 2) | "said the value of said variable" should read --the value of said variable-- |

Signed and Sealed this

Twenty-second Day of September, 2009

David J. Kappos
*Director of the United States Patent and Trademark Office*